(12) United States Patent
Kawahara

(10) Patent No.: US 7,689,094 B2
(45) Date of Patent: Mar. 30, 2010

(54) DATA PROCESSING APPARATUS, DATA PROCESSING METHOD, AND PROGRAM

(75) Inventor: Minoru Kawahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1268 days.

(21) Appl. No.: 10/685,148

(22) Filed: Oct. 14, 2003

(65) Prior Publication Data

US 2004/0076397 A1  Apr. 22, 2004

(30) Foreign Application Priority Data

Oct. 15, 2002  (JP) ............................. P2002-300268

(51) Int. Cl.
  *H04N 9/79* (2006.01)
(52) U.S. Cl. .................. 386/35; 386/111; 386/126; 386/52; 386/124; 386/83
(58) Field of Classification Search ................ 386/46, 386/55, 111–112, 35, 83, 88, 98, 124, 126, 386/52
See application file for complete search history.

(56) References Cited

U.S. PATENT DOCUMENTS 6,330,392 B1* 12/2001 Nakatani et al. ............. 386/52
6,546,188 B1* 4/2003 Ishii et al. .................. 386/52
2002/0057894 A1* 5/2002 Ishige ......................... 386/46

FOREIGN PATENT DOCUMENTS

| EP | 1 187 475 | 3/2002 |
|---|---|---|
| JP | 10 79913 | 3/1998 |
| JP | 10 233995 | 9/1998 |
| JP | 11136631 | 5/1999 |
| WO | WO 94 03851 | 2/1994 |

OTHER PUBLICATIONS

Patent Abstracts of Japan, vol. 1998, No. 13, Nov. 30, 1998 & JP 10 210410 A (Matsushita Electric Ind Co Ltd), Aug. 7, 1998.

* cited by examiner

*Primary Examiner*—Thai Tran
*Assistant Examiner*—Helen Shibru
(74) *Attorney, Agent, or Firm*—Frommer Lawrence & Haug LLP; William S. Frommer; Paul A. Levy

(57) ABSTRACT

A data processing method is disclosed which involves storing on an optical disk main line data as video data and low-resolution data, the latter data corresponding to the main line data but having a lower resolution and a smaller data amount than the main line data. The main line data and low-resolution data are read and decoded individually. The decoded result of the low-resolution data is selectively output until preparations for outputting the main line data are found completed. Once the preparations for outputting the main line data are complete, the decoded result of the main line data is output selectively.

24 Claims, 22 Drawing Sheets

F I G. 7
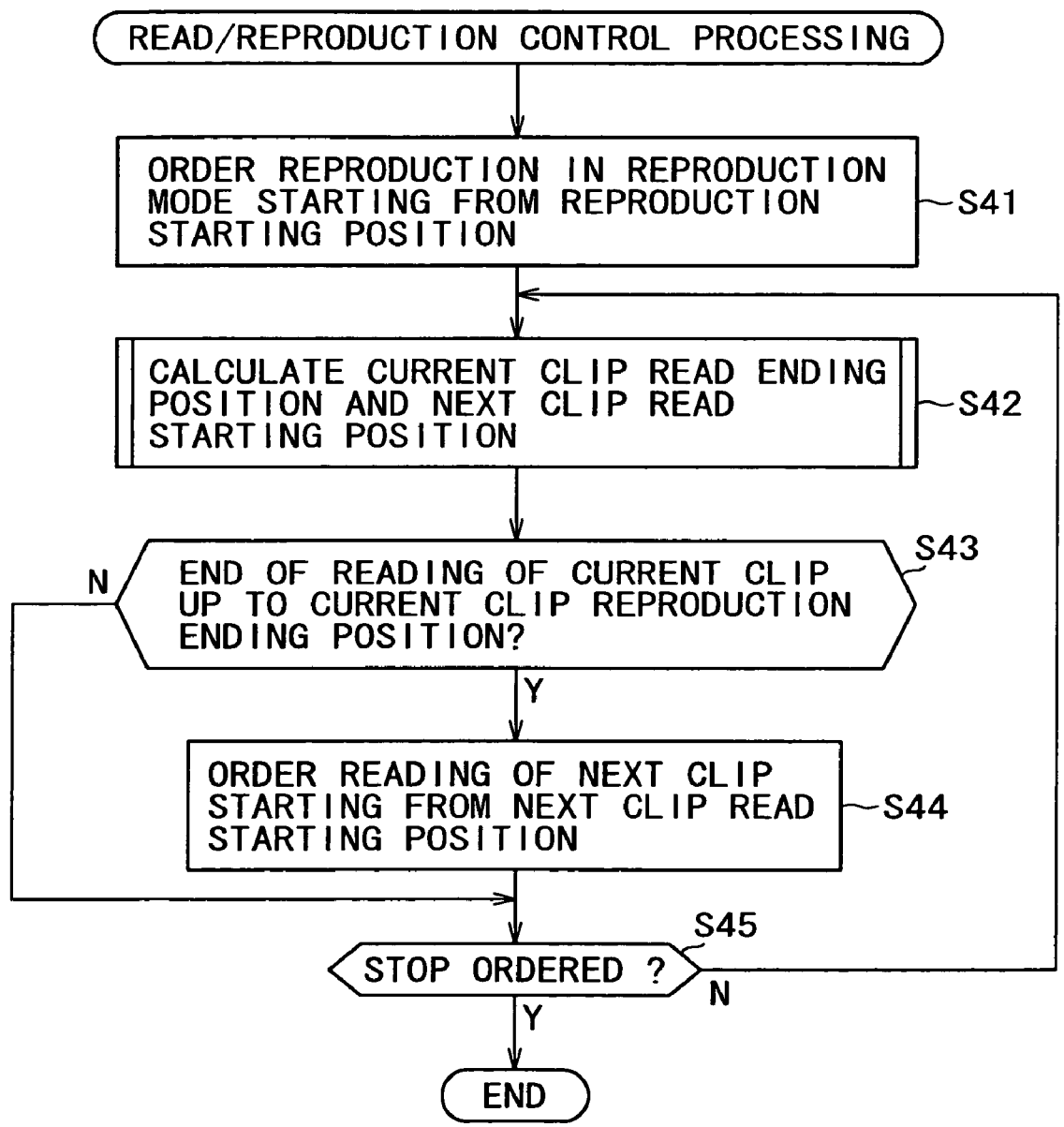

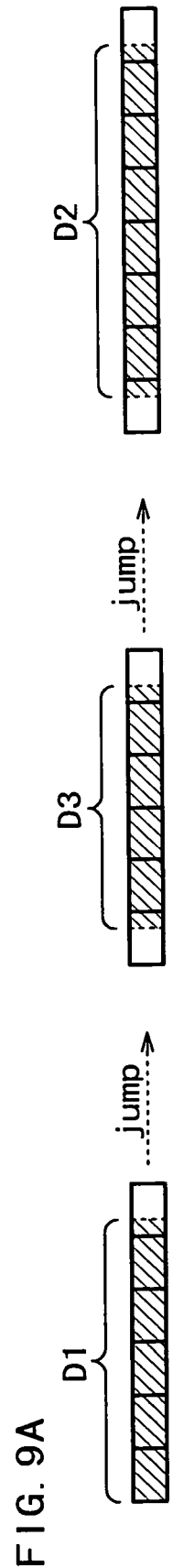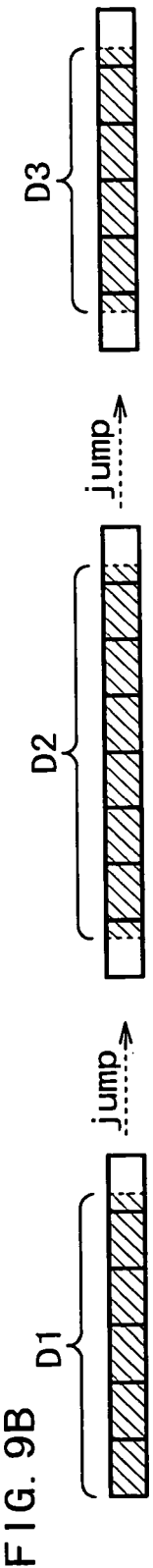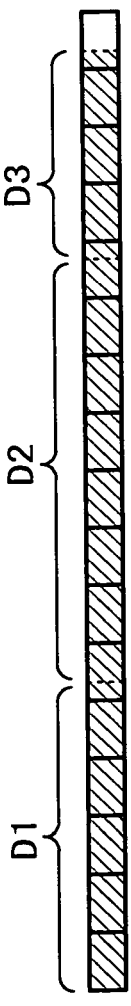
FIG. 9

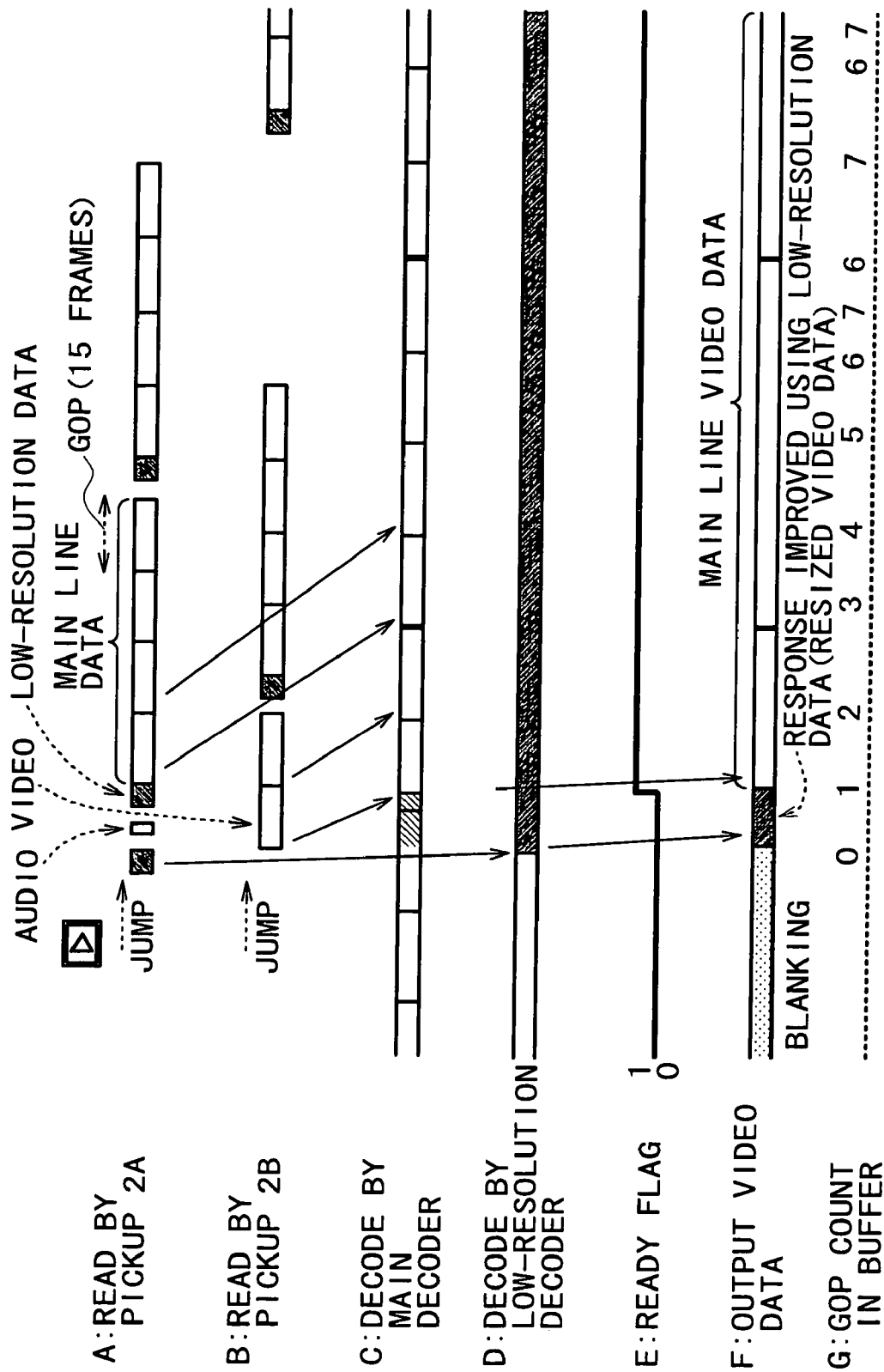

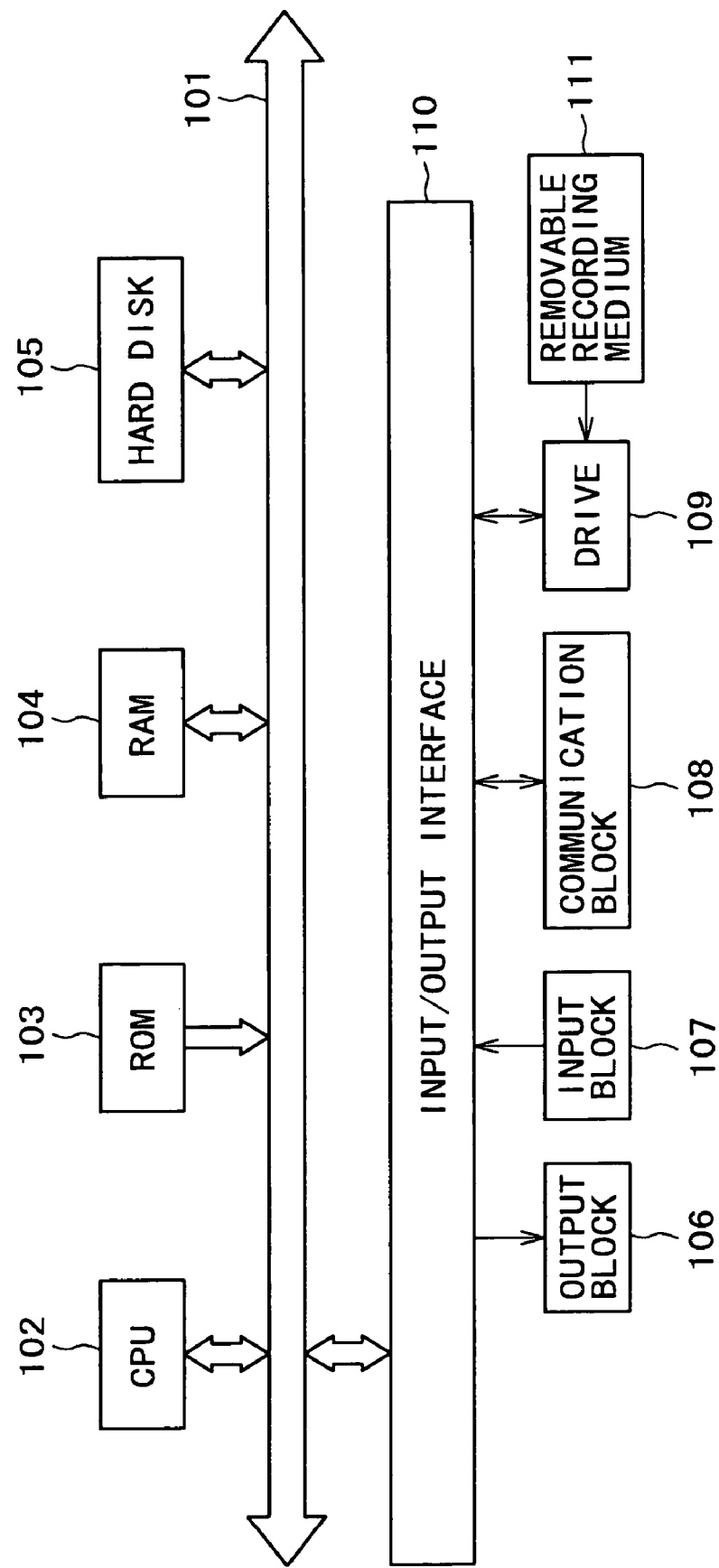

DATA PROCESSING APPARATUS, DATA PROCESSING METHOD, AND PROGRAM

BACKGROUND OF THE INVENTION

The present invention relates to a data processing apparatus, a data processing method, and a program.

Recently, recording media such as optical disks that are significantly enhanced in recording rate have come into general use. This has helped to realize long-time recording of video data with comparatively high picture quality.

Japanese Patent Laid-Open No. Hei 11-136631 discloses a method whereby pictures of the same content are prepared in two kinds, i.e., high-resolution and low-resolution video data, when recorded to an optical disk so that the video data with an optimum resolution may be selected depending on the purposes such as editing work.

Compared with audio data and text data, video data are huge in volume. That means the processing of video data is subject to significantly heavier loads than the processing of audio data or text data despite today's appreciable advances in the recording rate of recording media.

Video data processing apparatuses operated by users are so encumbered with the huge volume of video data that the result of video data processing is often slow to materialize. Such reduced operability of the apparatus is frustrating to the users. Illustratively, a user may operate a video data editing apparatus to start reproducing video data from a desired position on an optical disk. In that case, reproduction of video data from the desired position may take inordinately long time before getting started, which is annoying to the user.

One method for bypassing the problem above is to reduce the recording rate of video data to the optical disk. This method necessarily entails deterioration of picture quality during reproduction of video data. In particular, the method is unfit for business-use apparatuses because the apparatuses are required to record and reproduce video data at appreciably higher rates than their home-use counterparts.

In order to reduce the recording rate while decreasing picture quality deterioration, a method has been proposed by which video data are compressed by means of MPEG (Moving Picture Experts Group) encoding or the like. However, if video data are compressed illustratively by MPEG encoding, the decoding process often takes more time than is deemed acceptable. This can result in even less operability than before.

Specifically, common MPEG encoding involves encoding video data in a consecutive GOP (Group of Pictures) sequence. That means decoding a certain frame (field) sometimes requires decoding another GOP frame. In that case, it takes a long time to reproduce a desired frame after the user has performed the operation to reproduce that frame.

More specifically, to decode a B picture in a GOP of interest sometimes requires decoding a P picture in the preceding GOP. Furthermore, decoding that P picture in the preceding GOP may require decoding another P picture and an I picture in the same GOP. Overall, decoding the desired B picture in the GOP of interest may involve decoding many other pictures in advance. From the time that the user orders reproduction of the desired B picture in the GP of interest until the B picture is actually decoded and output, it may take an inordinately long time to decode the many other pictures.

Where a removable recording medium such as an optical disk is in use, it takes more time for the apparatus to find a desired picture on the disk than, say, on a hard disk drive. That is because a seek to a specific position on the optical disk takes longer than an access operation on the hard disk. The prolonged access time detracts from a "brisk" feel desired by the user in what is known as the cue-up operation on pictures.

Meanwhile, technology today has made nonlinear editing and nondestructive editing available. The nondestructive editing method involves setting what may be called edit points (known as in-points and out-points) with regard to material data, without editing (i.e., destroying) the material data themselves. More specifically, nondestructive editing involves preparing a list called a play list or an edit decision list made up of the edit points established during editing work on the material data of interest. The result of the editing is reproduced in accordance with the play list. That is, the material data are reproduced in keeping with the edit points described in the play list. Conventionally, where material data are to be encoded irreversibly in, say, MPEG format, the material data need to be first decoded. The decoded material data are then spliced as desired and encoded in MPEG format. By contrast, the nondestructive editing method has no need for such complicated processing involving decoding and encoding steps resulting in the deterioration of picture quality.

If a body of continuous material data ranging from one edit point (in-point) to the next edit point (out-point) derived from the above-described nondestructive editing is called a clip, then the result of nondestructive editing may be said to be reproduced on a clip by clip basis. Whereas consecutive material data are generally recorded on a physically continuous recording area on the optical disk, different clips constituting the material data are usually recorded in physically discrete recording areas on the same disk.

When the object to be reproduced shifts from, say, a first clip to a second clip on a disk apparatus reproducing the optical disk containing these clips, a track jump is effected starting from a recording area that has the first clip to another recording area that accommodates the second clip. In such a case, the track jump is followed by a rotational delay in which the beginning of the ensuing clip is being found. At the end of the rotational delay time, the next clip is reached and decoded for reproduction.

That is, the shift from one target clip to the next involves a track jump to the next clip followed by a rotational delay, a read and a decode operation, in that order, before the next clip is readied for output. At the end of the currently reproduced clip (called the current clip hereunder), it may be desired to start reproducing immediately the clip to be reproduced next (called the next clip). In that case, it is necessary to complete the preparations for outputting the next clip before reproduction of the current clip comes to an end.

It takes time to make the preparations for outputting a clip; they include a seek (made up of a track jump and a rotational delay) to the clip in question, a read, and a decode operation. Because the preparation time varies significantly depending on the performance of the disk apparatus in use, nondestructive editing allows for the differences in performance between optical disk reproducing apparatuses so that reproduction will not be interrupted upon shift from one target clip to another.

However, some removable recording media such as the optical disk are sometimes reproduced by a disk apparatus offering appreciably less performance than the disk apparatus that has effected nondestructive editing. In that case, seek and read operations on the data from the optical disk may take more time than is expected, which may leave the preparations for outputting the next clip incomplete at the end of the current clip being reproduced. As a result, the output (i.e., display) of the current clip may come to an end without being followed immediately by the output of the next clip, thereby interrupting the flow of clip reproduction.

The present invention has been made in view of the above circumstances and provides a data processing apparatus, a data processing method, and a program for improving the response of a disk reproducing apparatus in order to minimize the duration to obtain reproduction output following issuance of a reproduction order and to avert any disruption of continuous reproduction.

SUMMARY OF THE INVENTION

In carrying out the invention and according to one aspect thereof, there is provided a data processing apparatus including: a detector for detecting completion of preparations for outputting first data read from a data recording medium which stores the first data and second data corresponding to the first data and having a data amount smaller than that of the first data; and a selector for selectively outputting the second data read from the data recording medium until the completion of the preparations for outputting the first data is detected, the selector further outputting selectively the first data once the completion of the preparations for outputting the first data is detected.

According to another aspect of the invention, there is provided a data processing method including the steps of: detecting completion of preparations for outputting first data read from a data recording medium which stores the first data and second data corresponding to the first data and having a data amount smaller than that of the first data; and outputting selectively the second data read from the data recording medium until the completion of the preparations for outputting the first data is detected, the outputting step further outputting selectively the first data once the completion of the preparations for outputting the first data is detected.

According to a further aspect of the invention, there is provided a program for causing a computer to execute a data processing method including the steps of: detecting completion of preparations for outputting first data read from a data recording medium which stores the first data and second data corresponding to the first data and having a data amount smaller than that of the first data; and outputting selectively the second data read from the data recording medium until the completion of the preparations for outputting the first data is detected, the outputting step further outputting selectively the first data once the completion of the preparations for outputting the first data is detected.

Through the use of the data processing apparatus, data processing method, and program according to the invention, a check is made to detect completion of the preparations for outputting the first data read from the data recording medium which stores the first data as well as the second data corresponding to the first data and having a data amount smaller than that of the first data. The second data read from the data recording medium are selectively output until the completion of the preparations for outputting the first data is detected. The first data are then output selectively once the completion of the preparations for outputting the first data is detected.

BRIEF DESCRIPTION OF THE DRAWINGS

Further objects and advantages of this invention will become apparent upon a reading of the following description and appended drawings in which:

FIG. 7 is a flowchart of steps for implementing read/reproduction control processing;

FIGS. 9A, 9B and 9C are explanatory views illustrating algorithms of a file system;

FIG. 21 is another explanatory view illustrating how the disk reproducing apparatus works; and FIG. 22 is a block diagram depicting a typical structure of one embodiment of a computer according to the invention.

DETAILED DESCRIPTION OF THE PREFERRED EMBODIMENTS

Figure 1:
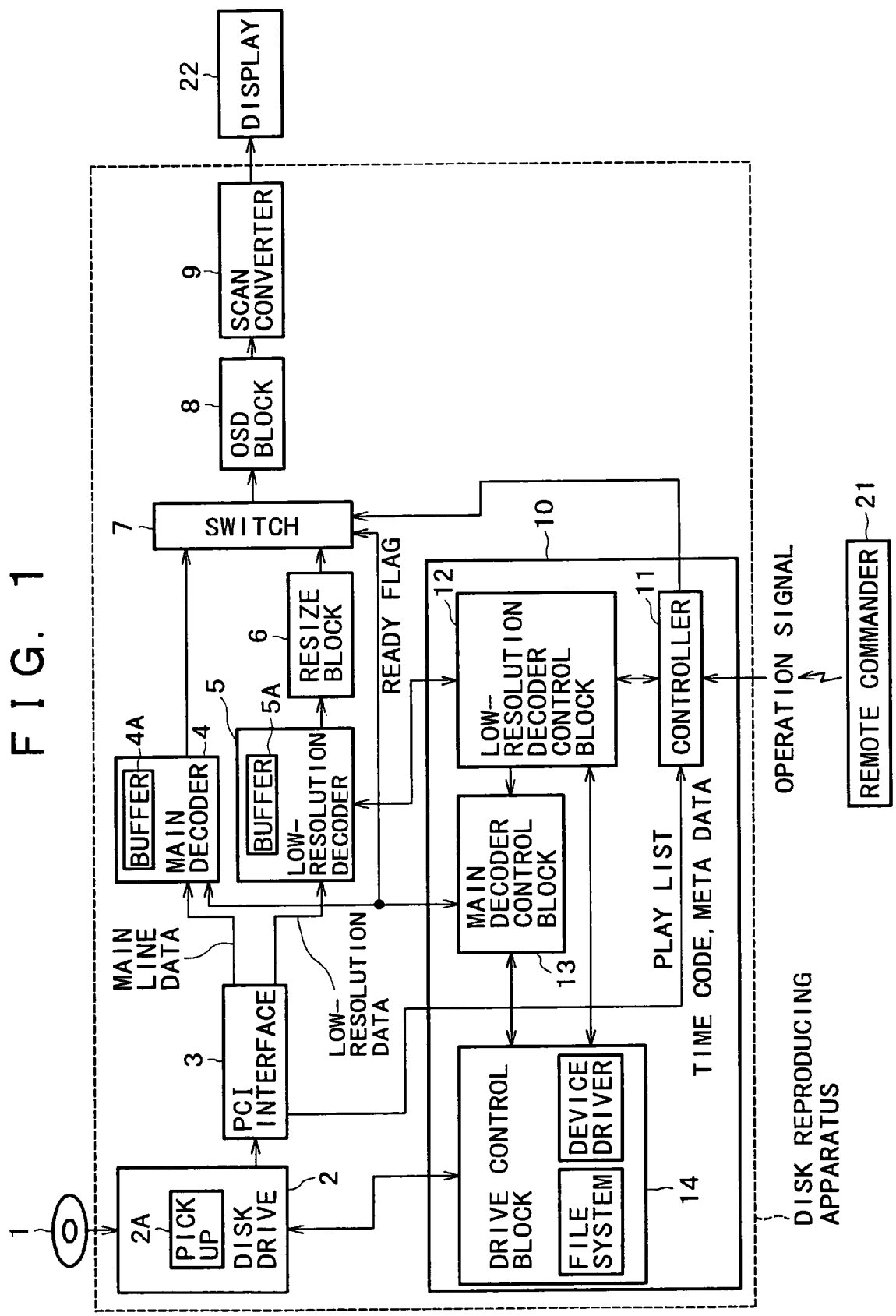
FIG. 1 is a block diagram showing a typical structure of a first embodiment of a disk reproducing apparatus according to the invention.

FIG. 1 is a block diagram showing a typical structure of a disk reproducing apparatus practiced as one embodiment of this invention. Referring to FIG. 1, an optical disk 1 accommodates video data constituting moving pictures of high or standard resolution, encoded illustratively using the MPEG standard. The optical disk 1 also stores video data which correspond to, but have a lower data amount than, the video data of high or standard resolution, i.e., video data of low-resolution obtained by lowering the resolution (e.g., spatial resolution) of the encoded high or standard resolution video data; the low-resolution video data are further encoded by a predetermined method.

The video data of high or standard resolution are originally intended to be offered to users. Encoding the video data provides a body of encoded data that may be called main line data hereunder. The video data of low resolution obtained by lowering the resolution of the high or standard resolution video data are encoded to become a body of encoded data that may be called low-resolution data hereunder.

The optical disk 1 can be loaded and unloaded into and from a disk drive 2. Under control of the drive control block 14 in a system controller 10, the disk drive 2 reads main line data and low-resolution data from the loaded optical disk and feeds the retrieved data to a PCI (Peripheral Component Interconnect) interface 3. More specifically, the disk drive 2 has a pickup 2A that emits a laser beam to the optical disk 1. On detecting reflected light from the disk surface, the pickup 2A outputs an RF (radio frequency) signal reflecting the amount of the reflected light detected. The disk drive 2 subjects the RF signal to demodulation or other necessary processing to obtain data that are sent to the PCI interface 3.

The PCI interface 3 acts as an interface between the disk drive 2 on the one hand and a main decoder 4 or a low-resolution decoder 5 on the other hand. As such, the PCI interface 3 supplies the main decoder 4 with the main line data sent from the disk drive 2, and feeds the low-resolution decoder 5 with the low-resolution data also sent from the disk drive 2.

It is possible to record on the optical disk 1 a play list prepared illustratively during nondestructive editing. Where the play list is stored on the optical disk 1, that list is read from the disk 1 by the disk drive 2 and sent to a controller 11 through the PCI interface 3. The optical disk 1 also stores meta data and a time code as will be discussed later. The meta data and time code are likewise read from the optical disk 1 by the disk drive 2 and supplied to the controller 11 via the PCI interface 3.

The main decoder 4 has a buffer 4A that temporarily holds the main line data coming from the PCI interface 3. Under control of a main decoder control block 13 in the system controller 10, the main decoder 4 decodes, using illustratively the MPEG standard, the main line data retained in the buffer 4A. High or standard resolution video data resulting from the decoding (called the main line video data hereunder) are fed to a switch 7. The main decoder 4 further feeds a ready flag to both the switch 7 and the main decoder control block 13, the ready flag denoting the status of preparations for outputting the video data obtained by decoding the main line data coming from the PCI interface 3.

The ready flag is illustratively a one-bit flag. For example, the ready flag is set to "1" if the main decoder 4 has completed the preparations for outputting the video data, and is set to "0" if the preparations are not complete.

The ready flag also represents general status of preparedness for main line data output. That means the ready flag is "0" to indicate that data output is yet to be ready, not only when the preparations for decoding and outputting another picture are incomplete before decoding the target picture; the flag is also "0" when an error in the main line data prevents pictures from getting decoded.

The low-resolution decoder 5 has a buffer 5A that temporarily holds the low-resolution data sent from the PCI interface 3. Under control of the low-resolution decoder block 12 in the system controller 10, the low-resolution decoder 5 decodes the low-resolution data held in the buffer 5A. Low-resolution video data resulting from the decoding (called the low-resolution video data hereunder) are fed to a resize block 6.

The resize block 6 is constituted illustratively by a polyphase filter of 5:2 long (3:1 for the PAL (Phase Alternation by Line) setup) and 11:4 wide. In operation, the resize block 6 thins out the horizontal lines of low-resolution video data, e.g., progressive video data formed by 30 horizontal lines per frame, to generate interleave-based video data made up of 60 horizontal lines per field. Furthermore, the resize block 6 interpolates or otherwise processes the pixels of the video data to generate video data having the same size (pixel count) as that of the main line video data output by the main decoder 4 (the resulting data may be called the resized video data hereunder). The resized video data are supplied to the switch 7. Alternatively, the processing of the resize block 6 may be taken over by the low-resolution decoder 5. The resize block 6 may also be eliminated outright.

In response to the ready flag coming from the main decoder 4, the switch 7 selects either the main line video data from the main decoder 4 or the resized video data from the resize block 6, and sends the selected data to an OSD (on-screen display) block 8. Also under control of the controller 11, the switch 7 selects likewise the main line video data from the main decoder 4 or the resized video data from the resize block 6 before feeding the selected data to the OSD block 4. In other words, the embodiment shown in FIG. 1 may adopt one of two control options, i.e., either the use of the ready flag or control of the controller 11, when causing the switch 7 to output either the main line video data or the resized video data.

The OSD block 8 superimposes as needed a time code or other information onto the video data from the switch 7 before sending the video data to a scan converter 9. The scan converter 9 converts the video data from the OSD block 8 in terms of the scanning format where necessary, and sends the converted video data to a display device 22 such as a CRT (cathode ray tube).

The system controller 10 is made up of the controller 11, low-resolution decoder control block 12, main decoder control block 13, and drive control block 14. The system controller 10 of this structure controls the component blocks constituting the disk reproducing apparatus.

More specifically, the controller 11 receives an operation signal generated by a remote commander 21 being operated by the user, as well as a play list, a time code and meta data coming from the PCI interface 3. In accordance with the operation signal, play list, time code and meta data thus received, the controller 11 controls the switch 7 and low-resolution decoder control block 12.

Under control of the controller 11, the low-resolution decoder control block 12 controls the low-resolution decoder 5 and drive control block 14.

The main decoder control block 13 monitors the control over the low-resolution decoder 5 effected by the low-resolution decoder control block 12. In keeping with what is being monitored, the main decoder control block 13 controls the main decoder 4 and drive control block 14.

The drive control block 14 is formed illustratively by a file system and a device driver. Under control of the low-resolution decoder control block 12 and main decoder control block 13, the drive control block 14 controls the disk drive 2.

In response to the user's operation, the remote commander 21 outputs illustratively an infrared operation signal. The display device 22 displays the video data being fed from the scan converter 9.

In the setup of FIG. 1, the system controller 10 may by implemented illustratively using software while the blocks other than the system controller 10 may be constituted by dedicated hardware. It is possible to implement the main decoder 4, low-resolution decoder 5, resize block 6, and switch 7 by having a DSP (digital signal processor) execute suitable programs. As another alternative, the system controller 10 may be implemented not by software but by use of dedicated hardware.

The disk reproducing apparatus of FIG. 1 has been shown targeted for data reproduction from the optical disk 1. Alternatively, the disk reproducing apparatus of FIG. 1 may address recording media other than the optical disk, such as magnetic disks, magneto-optical disks, and magnetic tapes.

Figure 2:
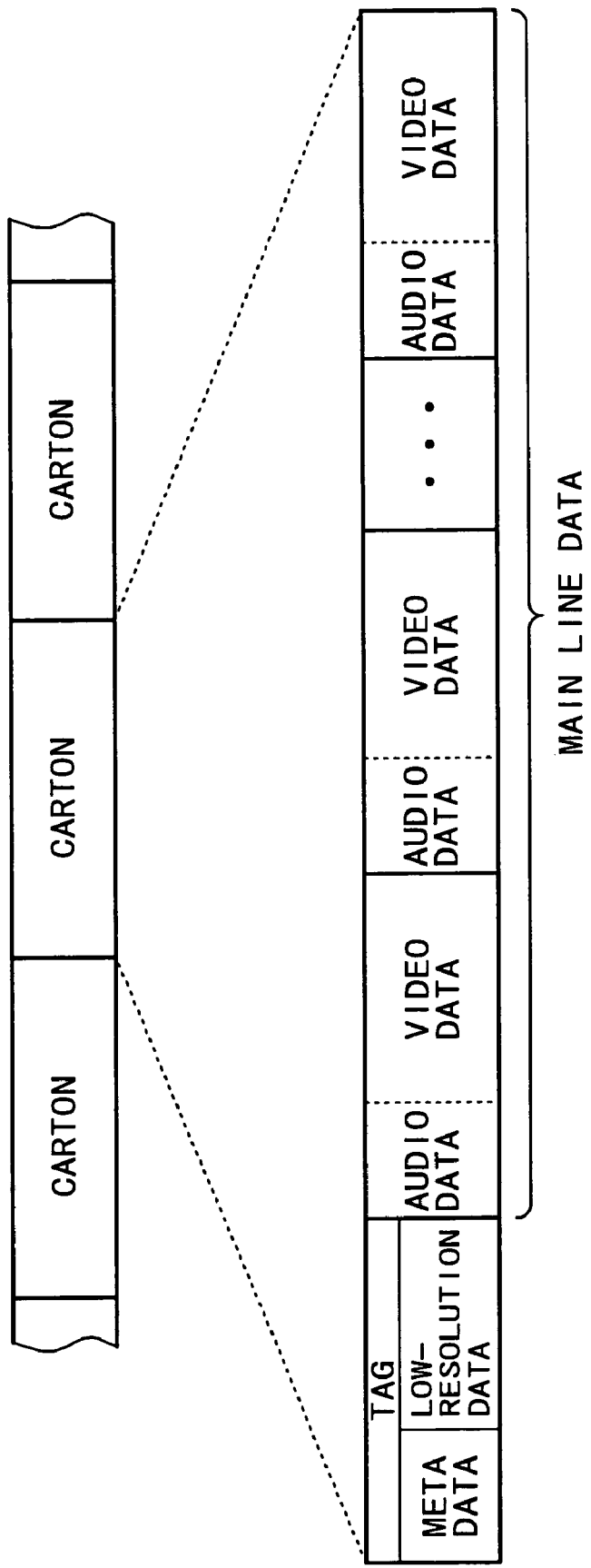
FIG. 2 is a schematic view depicting a typical recording format of an optical disk.

FIG. 2 shows a typical recording format of the optical disk 1. For example, the optical disk 1 is a CLV (constant linear velocity) type optical disk whose tracks are divided into a plurality of sectors. One or multiple sectors constitute what is called a cluster defined as the unit in which to write and read data to and from the optical disk 1. Each cluster may be formed by, say, a 64 KB (kilobyte) recording area.

As mentioned above, the optical disk 1 stores main line data and low-resolution data corresponding to the main line data. The main line data and low-resolution data are recorded intermittently, e.g., at intervals of a predetermined duration period of 1.5 to 2 seconds or in units of a predetermined data amount with regard to the original video data (i.e., video data before encoding).

It is assumed that a term "carton" represents a unit of main line data and low-resolution data corresponding to a predetermined duration period or a predetermined data amount of the original video data. On that assumption, the optical disk 1 holds the main line data and low-resolution data in units of cartons, as shown in FIG. 2. Where the recording of data to the CLV type optical disk 1, so-called shuttle reproduction from the disk 1, data error concealment on the disk 1, and the eject time of the disk 1 are taken into account, it is reasonable to establish a body of original video data for 1.5 to 2 seconds as the main line data per carton.

Each carton is constituted illustratively by low-resolution data followed by the main line data corresponding to the low-resolution data in question, as indicated in FIG. 2. That means the low-resolution video data obtained by decoding the low-resolution data placed in a given carton have the same content as the main line video data acquired by decoding the corresponding main line data; only the resolution is different.

It is possible to include within a body of main line data not only video data but also audio data accompanying the video data in question. For example, as shown in FIG. 2, video data of a specific data amount or for a specific reproduction duration are furnished as a single set, in combination with audio data associated with the video data.

The video data included in the main line data may be constituted illustratively by video data having a 25 Mbps (mega bits per second) data rate, with each GOP formed by 15 frames. The audio data included in the main line data may be constituted illustratively by audio data having an overall data rate of 3 Mbps, sampled at 48 kHz, and quantized in 16 bits over 4 channels. The low-resolution data may be those obtained by encoding video data in 256 (wide)×192 (long) pixels using the JPEG (Joint Photographic Coding Experts Group) standard.

If the low-resolution data are those obtained by encoding video data using the JPEG standard as described above, then the low-resolution decoder 5 in FIG. 1 is implemented using a JPEG decoder that carries out JPEG decoding. Alternatively, the low-resolution data may be those acquired by encoding video data using the MPEG standard.

Each carton may include not only low-resolution data and main line data but also the time code and meta data regarding the video data obtained by decoding the low-resolution data and main line data in question. The meta data may comprise some user-oriented information, as well as a position from which recording of the main line data is started, and information about a GOP structure of the video data included in the main line data. In each carton shown FIG. 2, a time code and meta data are furnished alongside of the low-resolution data. That is, the low-resolution data, time code, and meta data are arranged together in what is called a tag at the beginning of the carton (i.e., the position first to be read of the carton from the optical disk 1). The tag is followed by the main line data in each carton. When a specific carton is to be read from the optical disk 1, the tag of the carton is read first, followed by the main line data.

Suppose that the meta data such as a time code and low-resolution data have an overall data rate of 2 Mbps. In that case, the data recorded in units of cartons (FIG. 2) to the optical disk 1 have a data rate of 30 (=25+3+2) Mbps. It follows that the optical disk 1 may be the type of optical disk having a recording rate of, say, 35 Mbps or thereabouts for practical purposes.

The low-resolution data are located separately from the corresponding main line data when recorded on the optical disk 1. The low-resolution data have a sufficiently lower data rate and a less data amount than the corresponding main line data. This makes it possible to verify the low-resolution data upon recording onto the optical disk 1, so that the low-resolution data can be written much more reliably than the main line data.

The low-resolution data may be those obtained by encoding video data using a predetermined standard such as JPEG, as mentioned above. That means the content of the optical disk 1 can be verified easily regardless of the main line data being those acquired by encoding video data using any suitable standard. In this case, if the disk reproducing apparatus in use is at least capable of JPEG decoding, then the low-resolution data on the optical disk 1 can be decoded to permit verification of what is contained on the disk 1.

As described, the optical disk 1 stores not only main line data but also the low-resolution data which correspond to, but have a lower data amount than, the video data constituted by the main line data in question. The low-resolution data are read from the optical disk 1 along with the main line data. If an error is detected in a body of main line data, the corresponding low-resolution data may be used instead for error concealment thereby ensuring uninterrupted real-time reproduction. If a failed attempt to read a body of main line data threatens to disrupt the real-time reproduction, the corresponding low-resolution data with the lower data amount are immediately retrieved to ensure the continuous reproduction.

Although the main line data include not only video data but also audio data, the processing of such audio data by this embodiment will be omitted hereunder where appropriate for purpose of simplification. Although the foregoing description has shown a pattern of recording where an integral body of main line data is contained in each carton, this is not always the case. In practice, some main line video data corresponding to a body of low-resolution video data in a given carton may be recorded in the preceding or the ensuing carton. In actual patterns of recording on the disk, redundant data for demodulation, error correction, or cluster management purposes may sometimes disrupt the regular data layout such as the one shown in FIG. 2.

How the data reproducing apparatus of FIG. 1 works will now be described. First to be described is how data are read from the optical disk 1, with reference to the flowchart of FIG. 3.

Figure 3:
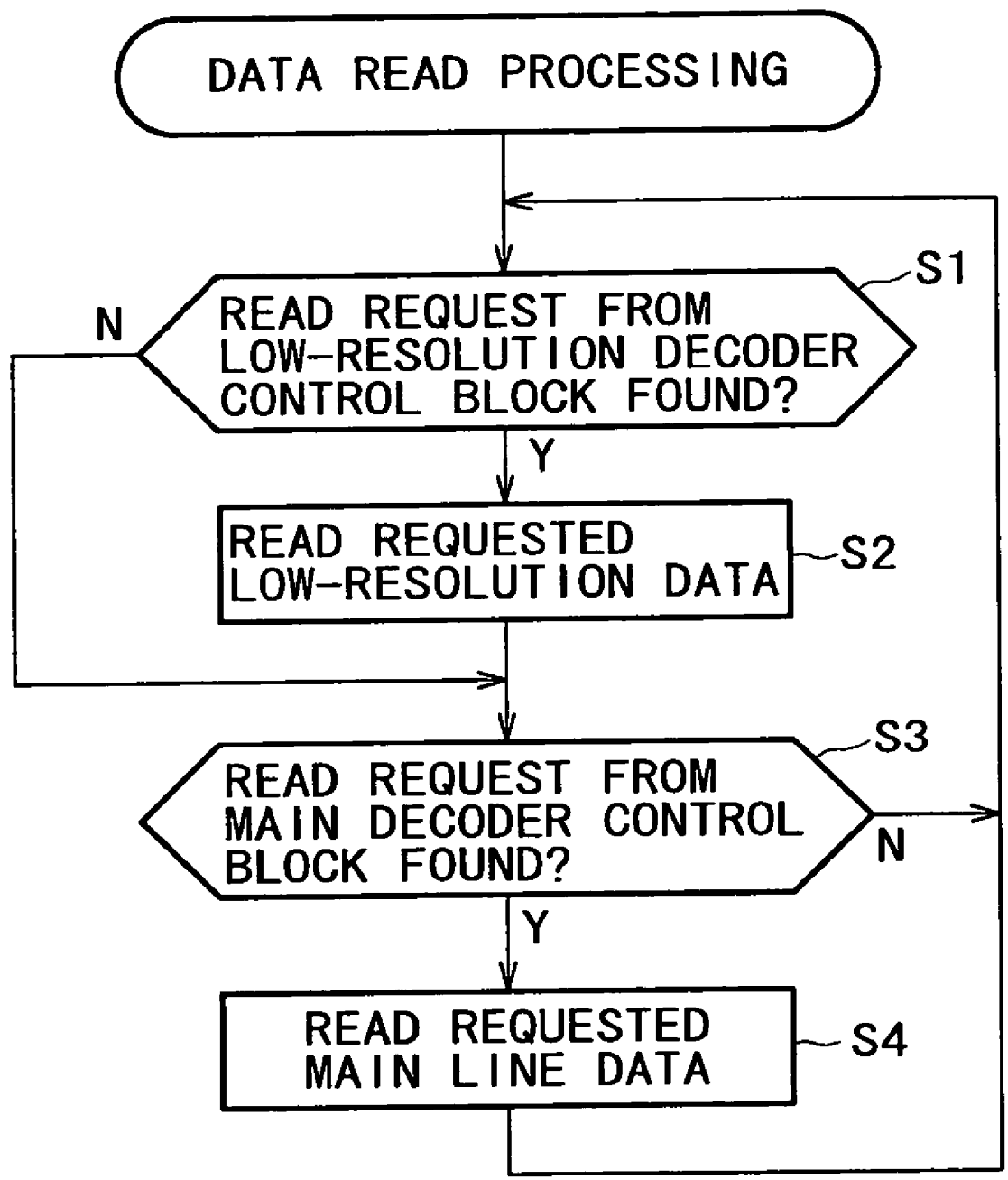
FIG. 3 is a flowchart of steps for implementing data read processing.

In step S1 of the data read processing in FIG. 3, the drive control block 14 determines whether a low-resolution data read request is received from the low-resolution decoder control block 12 requesting the reading of low-resolution data.

If in step S1 the low-resolution data read request is found to be received, step S2 is reached. In step S2, the drive control block 14 causes the disk drive 2 to read a tag containing the requested low-resolution data. Step S2 is followed by step S3. More specifically, the disk drive 2 reads the relevant tag in units of cartons, retrieves the low-resolution data from the tag, and supplies the retrieved data to the low-resolution decoder 5 through the PCI interface 3. The time code and meta data read from the tag in question on the optical disk 1 are sent from the disk drive 2 to the controller 11 via the PCI interface 3.

If in step S1 no low-resolution data read request is found received, then step S2 is skipped and step S3 is reached. In step S3, the drive control block 14 determines whether a main line data read request is received from the main decoder control block 13 requesting the reading of main line data.

If in step S3 no main line data read request is found received, step S4 is skipped and step S1 is reached again. The subsequent steps are then repeated.

If in step S3 the main line data read request is found to be received, step S4 is reached. In step S4, the drive control block 14 causes the disk drive 2 to read the requested main line data from the optical disk 1. More specifically, the disk drive 2 reads the relevant main line data in units of cartons and feeds the retrieved main line data to the main decoder 4 through the PCI interface 3.

Step S4 is followed by step S1, and the subsequent steps are repeated.

Figure 4:
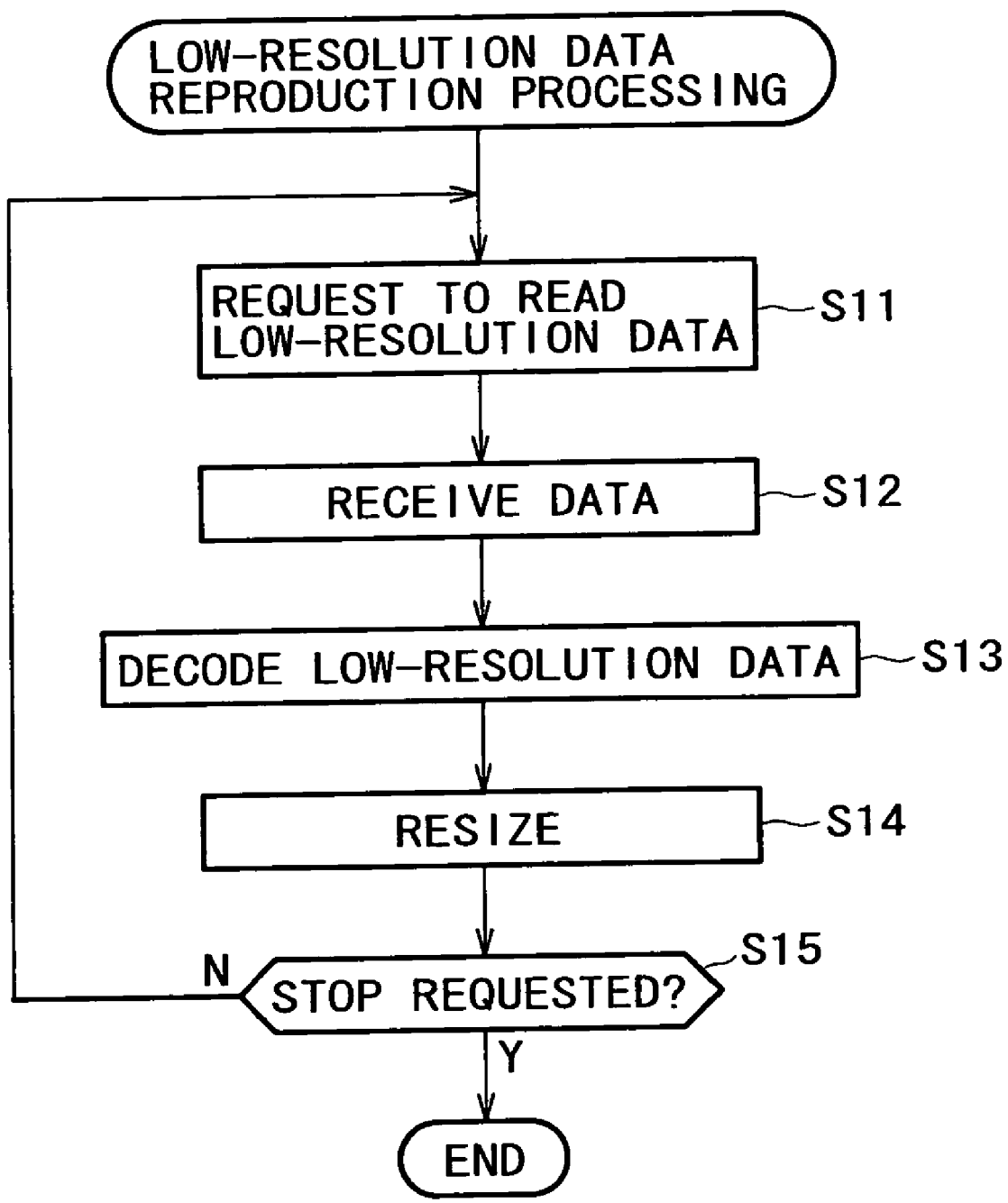
FIG. 4 is a flowchart of steps for implementing low-resolution data reproduction processing.

Described below with reference to the flowchart of FIG. 4 is how low-resolution data are reproduced from the optical disk 1. The low-resolution data reproduction processing is initiated illustratively by the user operating the remote commander 21. The user's operation prompts the remote commander 21 to output an operation signal causing the controller 11 to start reproducing data from the optical disk 1.

In response to the operation signal from the remote commander 21, the controller 11 supplies the low-resolution decoder control block 12 with a command to reproduce video data, together with a position from which to start the reproduction. The reproduction starting position is designated illustratively using a time code.

Where a play list is recorded on the optical disk 1, the controller 11 responding to the reproduction operation signal from the remote commander 21 illustratively causes the low-resolution decoder control block 12 to control the drive control block 14 in such a manner as to read the play list from the optical disk 1 through the disk drive 2 and PCI interface 3. In keeping with the play list thus retrieved, the controller 11 supplies the low-resolution decoder control unit 12 with the command to reproduce video data along with the position from which to start the reproduction. After the video data reproduction has begun, the controller 11 designates points to end and to restart the video data reproduction from the optical disk 1 by use of time codes. To be more specific, the play list describes an edit point indicating the beginning of a given clip (i.e., in-point) and an edit point denoting the end of the clip in question (out-point). In accordance with the play list, the controller 11 specifies, with the clip reproduction started, the ending position of the ongoing clip (current clip) and the starting position of the next clip to be reproduced.

Upon receipt of a video data reproduction command and a reproduction starting position from the controller 11, the low-resolution decoder control block 12 goes to step S11 and supplies the drive control block 14 with a low-resolution data read request requesting the low-resolution data starting from the reproduction starting position. Step S11 is followed by step S12.

In step S12, the low-resolution decoder 5 waits for and receives the low-resolution data. Step S12 is succeeded by step S13. More specifically, in response to the low-resolution data read request sent from the low-resolution decoder control block 12 to the drive control block 14 in step S11, the requested low-resolution data are read from the optical disk 1 and forwarded to the low-resolution decoder 5 through the PCI interface 3. The low-resolution decoder 5 receives in step S12 the low-resolution data thus supplied, before going to step S13.

In step S13, the low-resolution decoder 5 decodes the low-resolution data received in step S12, and supplies the resulting low-resolution video data to the resize block 6. Step S13 is followed by step S14 in which the resize block 6 resizes the received low-resolution video data into the same size as that of the main line video data and sends the resized video data to the switch 7. Step S14 is succeeded by step S15.

In step S15, the user illustratively operates the remote commander 21 to supply the controller 11 with an operation signal ordering a stop to the ongoing data reproduction from the optical disk 1 (the signal may be called the stop signal hereunder). The low-resolution decoder control block 12 determines whether the stop signal is supplied from the controller 11. If in step S15 the stop signal is not found supplied, step S11 is reached again in which the low-resolution decoder control block 12 feeds the drive control block 14 with a low-resolution data read request requesting the low-resolution data from the carton next to the one requested in the preceding step S11 (i.e., the next carton is the one immediately behind the carton requested in the preceding step S11). The subsequent steps are then repeated.

Where reproduction proceeds in accordance with the playlist, the controller 11 supplies the low-resolution decoder control block 12 with the ending position of the current clip and the starting position of the next clip as mentioned above. In that case, the low-resolution decoder control block 12 having reached step S11 supplies the drive control block 14 not with a low-resolution data read request requesting the low-resolution data from the carton next to the one requested in the preceding step S11, but with a low-resolution data read request reflecting the ending position of the current clip and the starting position of the next clip. More specifically, upon receipt of the ending position of a given clip from the controller 11, the low-resolution decoder control block 12 outputs a low-resolution data read request requesting the low-resolution data from the carton having the designated ending position, but does not output a low-resolution data read request requesting the low-resolution data from the next carton. On receiving the starting position of a given clip from the controller 11, the low-resolution decoder control block 12 outputs a low-resolution data read request requesting the low-resolution data from the carton having the designated starting position. Thereafter, the low-resolution decoder control block 12 outputs successively low-resolution data read requests each requesting the low-resolution data from the carton next to the one requested previously, until the output of a low-resolution data read request requesting the low-resolution data from, say, the carton having the ending position of the clip.

If in step S15 the stop signal is found to be supplied, the low-resolution data reproduction processing is brought to an end.

As described, the low-resolution decoder 5 keeps decoding the low-resolution data from the time the user orders video data reproduction until a reproduction stop order is issued. The low-resolution video data derived from the decoding are output to the resize block 6. In turn, the resize block 6 resizes the low-resolution video data and outputs the resized video data to the switch 7.

Because of their low data rate, the low-resolution data can be verified while being recorded onto the optical disk 1. It follows that there occurs practically no error when the low-resolution data are read from the optical disk 1, as opposed to the main line data that are difficult to verify while being written to the disk 1 because of their high data rate. If an error does occur, their low data rate allows the low-resolution data to be read again from the optical disk 1 without disrupting the real-time data reproduction.

Figure 5:
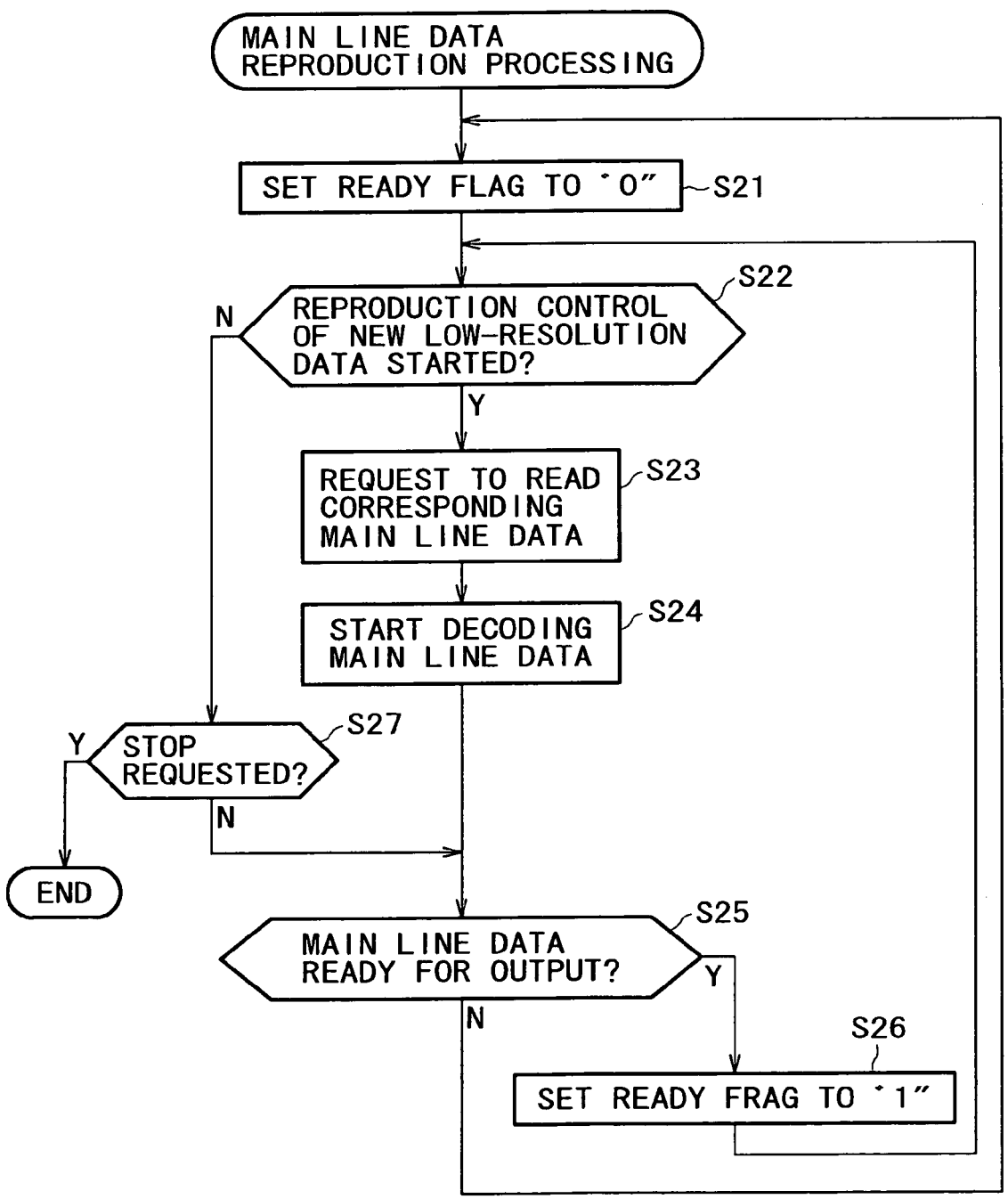
FIG. 5 is a flowchart of steps for implementing main line data reproduction processing.

Described below with reference to the flowchart of FIG. 5 is how main line data are reproduced. The main line data reproduction processing is initiated illustratively when the low-resolution data reproduction processing of FIG. 4 is started.

The main decoder control block 13 monitors the reproduction control over the low-resolution decoder 5 effected by the low-resolution decoder control block 12. By keeping track of the way the low-resolution decoder 5 is controlled during reproduction, the main decoder control block 13 controls accordingly the reproduction of the main line data.

Because the main decoder control block 13 controls the main line data reproduction by monitoring the way the low-resolution data 5 is controlled by the low-resolution decoder control block 12, the controller 11 need only control the low-resolution decoder control block 12. Since the main decoder control block 13 need not be controlled, the control burdens on the controller 11 are alleviated significantly.

In step S21 of the main line data reproduction processing in FIG. 5, the main decoder 4 sets the ready flag to "0" indicating that the preparations for data output are not complete, and sends the ready flag to the switch 7. Step S21 is followed by step S22.

In step S22, the main decoder control block 13 monitors the low-resolution decoder control block 12 to determine whether the control of low-resolution data reproduction from a new carton is started.

If in step S22 the control of low-resolution data reproduction from the new carton is found to be started, step S23 is reached. In step S23, the main decoder control block 13 supplies the drive control block 14 with a main line data read request requesting the main line data from the same carton. Step S23 is succeeded by step S24.

In step S24, the main decoder 4 waits for and receives the main line data from the new carton requested in step S23, and starts writing the received data to an internal buffer 4A. Also in step S24, the main decoder 4 starts decoding the main line data in the buffer 4A from the new carton. Step S24 is followed by step S25.

As described, the main decoder control block 13 controls main line data reproduction in accordance with the way the low-resolution decoder 5 is controlled by the low-resolution decoder control block 12 during the reproduction. As a result, the main line video data output by the main decoder 4 have the same content as the low-resolution video data output by the low-resolution decoder 5; only picture quality (e.g., resolution) is different.

By monitoring the low-resolution decoder control block 12, the main decoder control block 13 recognizes each frame decoded and output by the low-resolution decoder and the manner in which each frame is timed for output. Based on what is being monitored, the main decoder control block 13 causes the main decoder 4 to output the main video data of the same frame as that of the corresponding low-resolution video data in synchronism with the latter data being output.

In step S25, a check is made to see whether the main decoder 4 is ready to output the decoded result of the main line data, i.e., whether the preparations for outputting the main line video data obtained by decoding the main line data are completed.

If in step S25 the preparations for outputting the main line video data are found complete, step S26 is reached. In step S26, the main decoder 4 sets the ready flag to "1" indicating that the preparations for data output are complete, and sends the flag to the switch 7. Step S26 is succeeded by step S22, and the subsequent steps are repeated.

If in step S25 the preparations for outputting the main line video data are not found to be complete, that suggests two possibilities: either a failed attempt to read the main line data from the optical disk 1 has left the internal buffer 4A of the main decoder 4 devoid of the main line data to be decoded; or an uncorrectable error in the main line data read from the optical disk 1 is preventing the data from getting decoded. In such a case, reference must be made to a second picture in order to decode the MPEG-encoded picture constituting the main line data in question. If the decoding of that second picture has yet to be completed, step S21 is reached again. The main decoder 4 then sets the ready flag to "0" indicating that the preparations for data output are not complete, and sends the flag to the switch 7. Thereafter the subsequent steps are repeated.

The main decoder 4 thus decodes the main line data and outputs the resulting main line video data by keeping track of the way the low-resolution decoder 5 is controlled as mentioned above. When the main line video data are ready to be output, the main decoder 4 outputs the ready flag set to "1"; if the main line video data are not ready to be output for some reason, the main decoder 4 outputs the ready flag set to "0."

If in step S22 the reproduction control of any new low-resolution data is not found to be started, step S27 is reached. In step S27, the main decoder control block 13 determines whether the low-resolution decoder control block 12 has stopped the control of low-resolution data reproduction in response to the stop signal fed to the controller 11 from the remote commander 21 operated by the user.

If in step S27 the low-resolution decoder control block 12 is not found to have stopped the control of low-resolution data reproduction, then step S25 is reached. The subsequent steps are then repeated.

If in step S27 the low-resolution decoder control block 12 is found to have stopped the control of low-resolution data reproduction, the main line data reproduction processing is terminated.

As described, the main decoder 4 decodes the main line data reproduced from the optical disk 1 from the time the user orders video data reproduction until a reproduction stop order is issued, in keeping with the way the corresponding low-resolution data are being reproduced. The main line video data derived from the decoding are output to the switch 7.

Furthermore, the switch 7 is fed with the resized video data from the resize block 6 as described above.

The switch 7 selectively outputs one of two bodies of data: the main line video data from the main decoder 4, or the resized video data from the resize block 6. The selective output is effected under control of the controller 11 in accordance with the operation signal fed from the remote commander 21 operated by the user as discussed above. That means the user can watch either the main line video data of high or standard resolution or the resized video data of low resolution as needed.

The switch 7 may arrange to supply the display device 22 acting as a monitor of high or standard resolution with the main line video data of high or standard resolution from the main decoder for display, and to feed an editing device or other suitable image processing equipment, not shown, with the low-resolution video data from the low-resolution decoder 5 for display. That is, the display device 22 provides monitoring based on the main line video data of high or standard resolution while the actual processing is carried out by the image processing equipment using the low-resolution video data. That means the processing burdens on the image processing equipment are alleviated appreciably with the main line video data used for monitoring.

Figure 6:
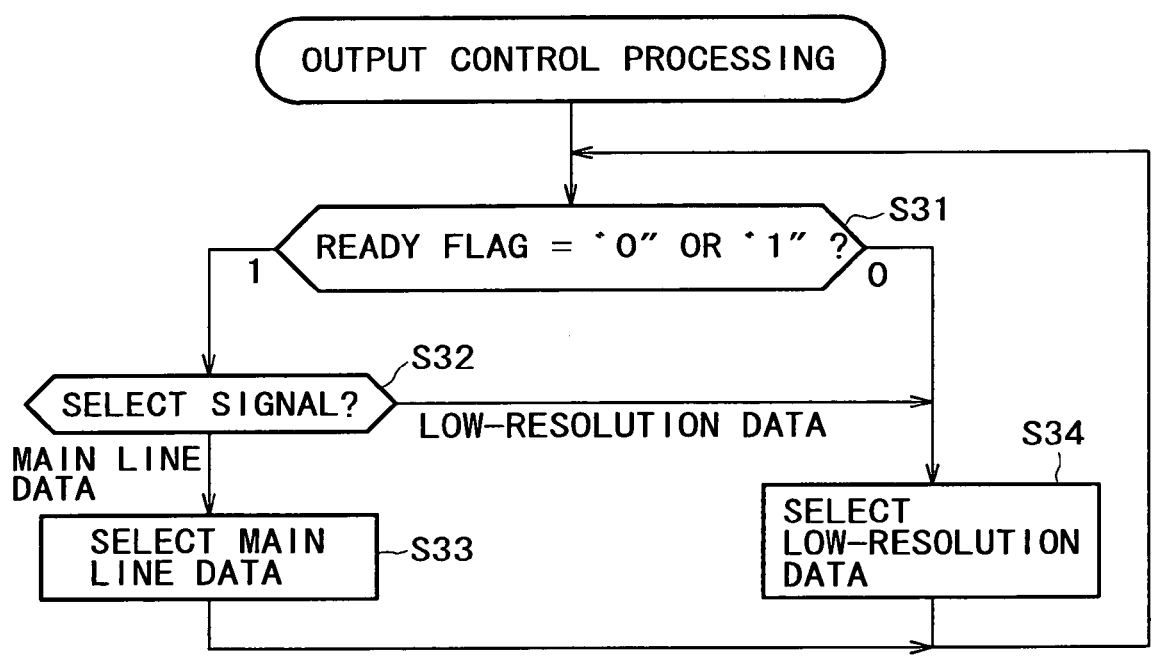
FIG. 6 is a flowchart of steps for implementing output control processing.

Described below with reference to the flowchart of FIG. 6 is how the switch 7 selectively outputs either the main line video data from the main decoder 4 or the resized video data from the resize block 6.

In step S31 of the output control processing shown in FIG. 6, the switch 7 determines whether the ready flag is set to "0" or "1." If in step S31 the ready flag is found to be "1," that means the main decoder 4 has signaled its readiness to output the main line video data. If that is the case, step S32 is reached in which the switch 7 determines whether a select signal from the controller 11 denotes the main line data or the low-resolution data.

More specifically, the controller 11 receives an operation signal from the remote commander 21 operated by the user, the signal specifying the selection of either the main line data or the low-resolution data. According to the operation signal, the controller 11 supplies the switch 7 with the select signal designating either the main line data or the low-resolution data. In this manner, the controller 11 checks the select signal from the controller 11 in step S32 to see whether the main line data or the low-resolution data are designated.

If in step S32 the select signal from the controller 11 is found to denote the main line data, step S33 is reached. In step S33, the switch 7 selects the main line video data from the main decoder 4 instead of the resized video data from the resize block 6. Step S33 is followed by step S31.

If in step S32 the select signal from the controller 11 is found to designate the low-resolution data, step S34 is reached. In step S34, the switch 7 selects the resized video data from the resize block 6 instead of the main line video data from the main decoder 4. From step S34, control is returned to step S31.

As described, if the ready flag indicates that the preparations for outputting the main line video data are complete, then the switch 7 outputs either the main line video data or the resized video data in response to the user's operation. The selectively output video data are sent through the OSD block 8 and scan converter 9 to the display device 22 for display.

If in step S31 the ready flag is found to be "0," that means the main decoder 4 has signaled that it is not ready to output the main line video data. In that case, step S34 is reached in which the switch 7 selectively outputs the resized video data as described above. Step S34 is succeeded by step S31.

Where the ready flag indicates that the preparations for outputting the main line video data have yet to be complete, the switch 7 always outputs the resized video data regardless of the user's operation. The selectively output video data are forwarded through the OSD block 8 and scan converter 9 to the display device 22 for display.

Described below with reference to the flowchart of FIG. 7 is how the controller 11 controls reading and reproduction of data from the optical disk 1. The read/reproduction control processing of FIG. 7 is initiated illustratively when the remote commander 21 operated by the user feeds the controller 11 with an operation signal designating data reproduction from the optical disk 1.

In step S41 of FIG. 7, the controller 11 responding to an operation signal from the remote commander 21 supplies the low-resolution decoder control block 12 with a command to reproduce video data together with a position from which to start the video data reproduction. To be more specific, the remote commander 21 allows the user to input a desired reproduction starting position. The controller 11 checks whether such a reproduction starting position is included in the operation signal sent from the remote commander 21 designating data reproduction from the optical disk 1. If the reproduction starting position is found to be included in the operation signal, that position is forwarded illustratively to the low-resolution decoder control block 12. If the controller 11 determines that no reproduction starting position is included in the operation signal sent from the remote commander 21 specifying data reproduction from the optical disk 1, the controller 11 establishes as the reproduction starting position the position in which the preceding data reproduction ended, and supplies that position to the low-resolution decoder control block 12.

Besides the reproduction starting position, the controller 11 signals a reproduction mode to the low-resolution decoder control block 12. There are such reproduction modes as normal reproduction (standard speed reproduction), high-speed reproduction, and reverse reproduction. The reproduction mode may be input through the remote commander 21. If in step S41 any reproduction mode is found input through the remote commander 21 operated by the user, that reproduction mode is signaled to the low-resolution decoder control block 12. If no reproduction mode is found input through the remote commander 21 in step S41, the normal reproduction mode is signaled as the default reproduction mode to the low-resolution decoder block 12. Although not described with reference to FIGS. 5 and 6 above, the low-resolution data and main line data are reproduced in the reproduction mode signaled to the low-resolution decoder control block in step S41.

If the controller 11 is to reproduce video data consecutively from the optical disk without recourse to a play list, then the controller 11 goes from step S41 to step S45, skipping steps S42 through S44. If the controller 11 is to reproduce video data from the optical disk 1 in accordance with the play list, the controller 11 reaches step S42.

In step S42, the controller 11 calculates a current clip read ending position and a next clip read starting position, in a manner described later in more detail. The current clip read ending position is the position where the reading of the currently reproduced clip (current clip) from the optical disk 1 is brought to an end. The next clip read starting position refers to the position where the reading of the next clip to be reproduced following the current clip from the optical disk 1 is to be started. Step S42 is followed by step S43.

The current clip read ending position and the next clip read starting position are each represented illustratively by a time code.

In step S43, the controller 11 references the time code fed from the PCI interface 3 to determine whether the reading of the main line data in the current clip up to the current clip read ending position has ended on the optical disk 1. If in step S43 the reading of the main line data in the current clip up to the current clip read ending position has not ended yet, step S44 is skipped and step S45 is reached.

If in step S43 the reading of the main line data in the current clip up to the current clip read ending position is found to have ended, step S44 is reached. In step S44, the controller 11 orders the low-resolution decoder control block 12 to give the main decoder control block 13 a command to read the main line data starting from the next clip read starting position. Step S44 is followed by step S45.

On receiving from the controller 11 the command to read the main line data starting from the next clip read starting position (the command may be called the next clip read command hereunder), the main decoder control block 13 requests the drive control block 14 to terminate the ongoing reading of the main line data from the optical disk 1 and to read the main line data starting from the next clip read starting position.

In step S45, the controller 11 determines whether a stop signal is received from the remote commander 21 operated by the user. If in step S45 no stop signal is found to be received, step S42 is reached again and the subsequent steps are repeated. If in step S45 the stop signal is found received, the controller 11 forwards the stop signal to the low-resolution decoder control block 12 to terminate the read/reproduction control processing.

Figure 8:
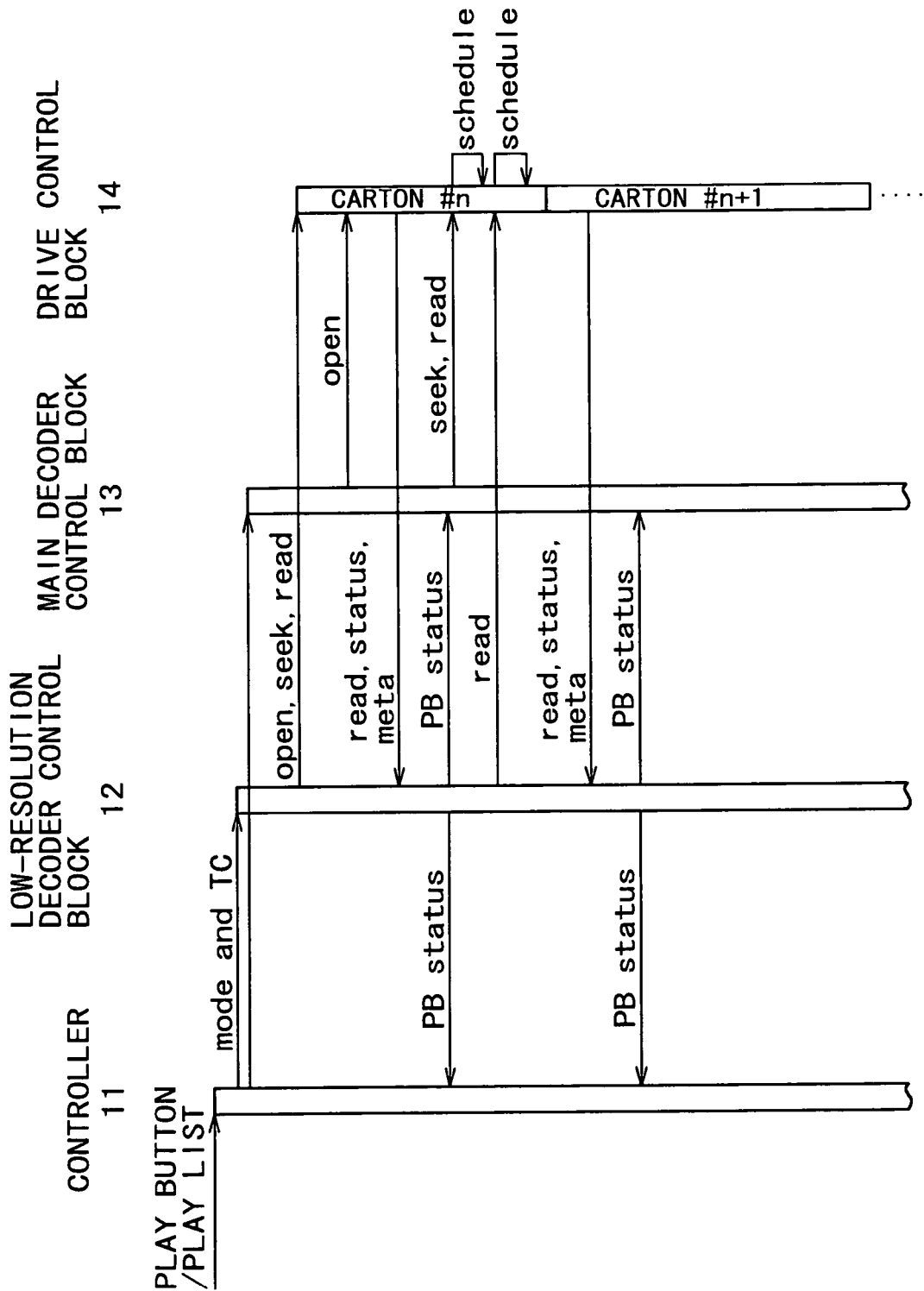
FIG. 8 is an explanatory view outlining how a controller, a low-resolution decoder control block, a main decoder control block, and a drive control block of the disk reproducing apparatus operate.

What follows is a more detailed description of how the controller 11, low-resolution decoder control block 12, main decoder control block 13, and drive control block 14 operate. Reference will be made to FIG. 8 for the ensuing description.

Illustratively, upon receipt of a reproduction command from the remote commander 21, the controller 11 supplies accordingly the low-resolution decoder control block 12 with a reproduction mode and a time code (TC) indicative of a reproduction starting position. The controller 11 also signals the reproduction mode and time code to the main decoder control block 13 through the low-resolution decoder control block 12. In accordance with the reproduction mode and reproduction starting position (TC) from the controller 11, the low-resolution decoder control block 12 supplies the drive control block 14 with an open command to open a file on the optical disk 1, a seek command to do a seek to the reproduction starting position on the disk, and a read command to read the tag (see FIG. 2) of a carton #n having the main line data in the reproduction starting position. Given the reproduction mode and reproduction starting position (TC) from the controller 11, the main decoder control block 13 supplies accordingly the drive control block 14 with the open command to open the file on the optical disk 1.

In response to the open command, seek command, and read command from the low-resolution decoder control block 12, the drive control block 14 causes the disk drive 2 to read the tag of the carton #n having the main line data in the reproduction starting position. The drive control block 14 further supplies the low-resolution decoder control block 12 with read status and meta data regarding the read operation. The read status includes data read status information signaling illustratively that the data have been read without error or that an attempt to read the data has failed due to an error. The meta data include static information regarding the optical disk 1 and disk drive 2, such as the physical position of those data on the optical disk 1 which have been read by the disk drive 2.

On receiving the read status and meta data from the drive control block 14, the low-resolution decoder control block 12 supplies playback (PB) status including the received data to the controller 11 and main decoder control block 13.

The read status includes not only the information mentioned above but also, say, the rate of data read from the optical disk 1. The data read rate is sent as part of the playback (PB) status from the low-resolution decoder control block 12 to the controller 11. Based on the data read rate thus supplied, the controller 11 calculates (i.e., estimates) the duration required to read the data from the optical disk 1.

In synchronism with the playback (PB) status fed from the low-resolution decoder control block 12, the main decoder control block 13 supplies the drive control block 14 with a seek command to do a seek to the main line data on the optical disk 1 and a read command to read the main line data in question. In response to the seek command and read command from the main decoder control block 13, the drive control block 14 causes the disk drive 2 to read the main line data from the carton #n having the tag read in keeping with the preceding read command from the low-resolution decoder control block 12. The drive control block 14 draws up a schedule, to be described later, when reading the main line data.

Thereafter the low-resolution decoder control block 12 supplies the drive control block 14 with a read command to read the tag of the next carton #n+1. In response to the read command from the low-resolution decoder control block 12, the drive control block 14 causes the disk drive 2 to read the tag of the carton #n. The drive control block 14 also feeds the low-resolution decoder control block 12 with read status and meta data regarding the read operation.

Upon receipt of the read status and meta data from the drive control block 14, the low-resolution decoder control block 12 supplies the controller 11 and main decoder control block 13 with playback (PB) status containing the received data. In synchronism with the playback (PB) status coming from the low-resolution decoder control block 12, the main decoder control block 13 supplies the drive control block 14 with a seek command to do a seek to the main line data on the optical disk 1 and a read command to read the main line data in question. In response to the seek command and read command from the main decoder control block 13, the drive control block 14 causes the disk drive 2 to read the main line data from the carton #n+1 having the tag read in keeping with the preceding read command from the low-resolution decoder control block 12. In like manner, the tag containing the low-resolution data of each carton and the corresponding main line data are successively read thereafter from the optical disk 1.

The drive control block 14 draws up schedules as mentioned in connection with FIG. 8 when reading main line data from the optical disk 1. To be more specific, the drive control block 14 is made up of a file system and a device drive as described earlier. The low-resolution decoder control block 12 and main decoder control block 13 supply the drive control block 14 with the open command, seek command, and read command to have the target data read from the optical disk 1 as described in conjunction with FIG. 8. Each of these commands includes, as needed, the file name of the data to be read from the optical disk 1 as well as the corresponding time code. Given the file name and time code, the file system constituting part of the drive control block 14 calculates the clusters containing the corresponding data over the optical disk 1, and requests the device driver to read the data accordingly.

The speed of access to the optical disk 1 is significantly lower than the speed of access to the magnetic disc such as hard disks. Because both the low-resolution decoder control block 12 and the main decoder control block 13 request the file system to read data, the file system is required to read the requested data efficiently from the optical disk 1. Given that requirement, the file system draws up a schedule to read data from the optical disk 1 using an algorithm that will be described later with reference to FIGS. 9A, 9B and 9C. With the schedule drawn up, the file system indicates to the device driver the cluster from which to read the data.

Illustratively, suppose that data blocks D1, D2 and D3 are stored on the optical disk 1, in that order, and that the file system is requested to read first the data block D1 followed by the blocks D3 and D2, in that order, from the optical disk 1.

In such a case, the file system indicates to the device driver the top clusters of the data blocks D1, D3 and D2 in the requested sequence. In turn, the disk drive 2 first jumps to and reads the top cluster of the data block D1, then jumps to and reads the top cluster of the data block D3, and finally jumps to and reads the top cluster of the data block D2, as shown in FIG. 9A.

That is, although the data blocks D1, D2 and D3 are physically recorded continuously, the jumps that must be made by the disk drive 2 to reach the top clusters of the data blocks D1, D3 an D3, in that sequence, reduce the efficiency of the data read operation. In FIGS. 9A, 9B and 9C, each rectangle represents a cluster. Of the rectangles shown, those shaded stand for data blocks where data are recorded.

With the file system in use, there is a method whereby the data blocks D1, D3 and D2 are sorted into their recorded sequence of D1, D2 and D3, their respective top clusters being indicated to the device driver.

However, the method above still involves having the disk drive 2 first jump to and read the top cluster of the data block D1, then jump to and read the top cluster of the data block D2, and finally jump to and read the top cluster of the data block D3, as shown in FIG. 9B. According to this method, the jump must still be made by the disk drive 2 immediately before each of the data blocks D1, D2 and D3. That means there is little improvement in the efficiency of reading data as compared with the case where the data blocks D1, D3 and D2 are read in that sequence.

The bottleneck above is bypassed illustratively as follows: the file system first identifies those clusters on the optical disk 1 which store the data blocks requested to be read. The file system then checks to see whether the identified clusters have any overlaps with the clusters of the data blocks being spooled and whether any of these clusters are located adjacent to one another. The idea is to determine whether a plurality of data blocks are stored in continuous clusters. If multiple data blocks are found stored in continuous clusters, the file system draws up a schedule according to which these data blocks can be read from the continuous clusters following a single seek.

More specifically, the file system draws up a schedule for consecutively reading the data blocks D1, D2 and D3 located continuously on the optical disk 1, the read operation starting from the top cluster of the first data block D1 and ending with the last cluster of the last data block D3 as shown in FIG. 9C. According to this schedule, the file system indicates the top cluster of the data block D1 and the last cluster of the data block D3 to the device driver. In turn, the disk drive 2 reads the data blocks D1, D2 and D3 consecutively. In this case, the disk drive 2 executes only a single jump to the top cluster of the data block D1, and then the data blocks D1, D2 and D3 are retrieved successively. This contributes significantly to improving the efficiency of the data read operation.

The switch 7 then checks the ready flag as discussed earlier with reference to FIG. 6. If the ready flag is found to indicate that the preparations for outputting the main line video data are not completed yet, the switch 7 selectively outputs the resized video data from the resize block 6; if the ready flag indicates that the preparations for outputting the main line video data are complete, the switch 7 basically selects and outputs the main line video data coming from the main decoder 4.

That is, the switch 7 selectively outputs the resized video data (low-resolution video data) until the main line video data are ready to be output. Once the preparations are complete for outputting the main line video data, the switch 7 selectively outputs the main line video data in question. This arrangement improves the response of the disk reproducing apparatus by reducing the duration required to display video data on the display device 22 after a reproduction command is issued.

Suppose that, where a long GOP (group of pictures) scheme is adopted, the main line data are those obtained by encoding video data using the MPEG standard; that one long GOP is formed by 15 frames (pictures); and that the pictures making up the single GOP are each represented by a picture type abbreviation (I for Intra, P for Predictive, and B for Bidirectionally Predictive) and a numeral indicating where the picture in question stands in the picture sequence constituting the GOP. On that assumption, the pictures making up one GOP are represented illustratively by B1, B2, I3, B4, B5, P6, B7, B8, P9, B10, B11, P12, B13, B14, and P15.

Figure 10:
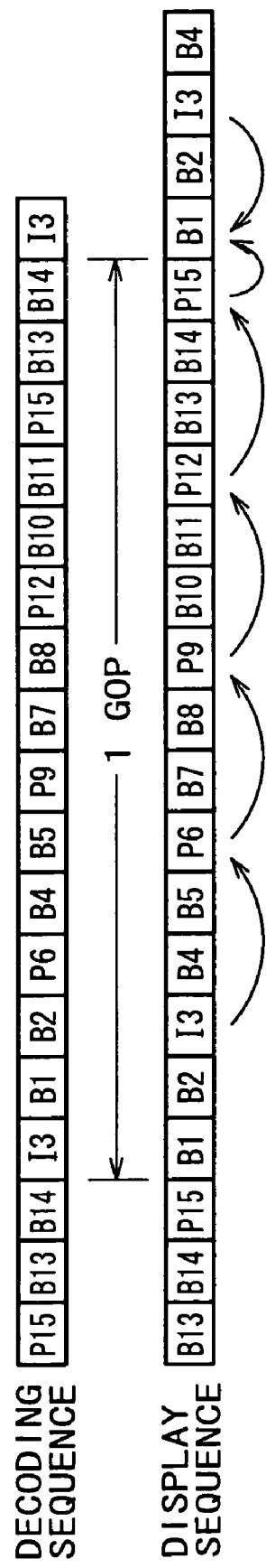
FIG. 10 is a schematic view showing how the encoding/decoding sequence is typically related to the display sequence under the MPEG scheme.

By the MPEG standard, a B picture is encoded or decoded by referencing an I or P picture to be displayed later than that B picture. That means the encoding/decoding sequence differs from the display sequence as shown in FIG. 10.

As a result, whereas the pictures in the GOP are displayed in the sequence discussed above, they are encoded or decoded in the sequence of, say, I3, B1, B2, P6, B4, B5, P9, B7, B8, P12, B10, B11, P15, B13, and B14.

Of the GOPs sequenced as described, a GOP #i (i-th GOP from the top) is taken up here as an example. If the first picture B1 of the GOP #i is to be decoded, the decoding involves referring to the I or P picture preceding the picture B1 (in the display sequence) as well as to the I or P picture immediately after the picture B1. That is, to decode the picture B1 of the GOP #i requires reference to the picture I3 of the same GOP #i and to a picture P15 of the preceding GOP #i-1.

Decoding the picture P15 of the GOP #i-1 further requires reference to a picture P12 of the GOP #i-1. With the GOP #i-1, decoding the picture P12 likewise requires reference to a picture P9; decoding the picture P9 requires reference to a picture P6; and decoding the picture P6 requires reference to a picture I3.

If reproduction is to be started from the first picture B1 of the GOP #i, the picture B1 can only be decoded after the decoding of at least the pictures I3, P6, P9, P12 and P15 of the preceding GOP #i-1 followed by the decoding of the picture I3 of the GOP #i. In other words, in order to start reproduction from the picture B1 of the GOP #i, the pictures I3, P6, P9, P12 and P15 of the GOP #i-1 must be decoded beforehand although these pictures are not displayed prior to the picture B1 of the GOP #i.

As a result, where reproduction is ordered to start from the picture B1 of the GOP #i, the reproduction of that picture B1 cannot be started unless and until at least the pictures I3, P6, P9, P12 and P15 of the preceding GOP #i-1 are decoded followed by decoding of the picture I3 of the GOP #i.

FIGS. 11A through 11D show how main line data are read from the optical disk 1 and displayed (output) on the display device 22 when the reproduction of, say, a picture B8 of a given GOP #i is ordered. In this case, a picture I3 of the GOP #i starts getting read from the optical disk 1 as shown in 11A. Thereafter the pictures of the GOP #i are read in their decoding sequence. That is, the picture I3 of the GOP #1 is read first, followed by pictures B1, B2, P6, B4, etc., of the same GOP #i.

After reading of the GOP #i from the optical disk 1 is started, the pictures constituting the retrieved GOP #i are supplied to the main decoder 4 through the disk drive 2 and PCI interface 3. In turn, the main decoder 4 starts decoding the supplied GOP #i.

Because reproduction is being ordered to proceed from the picture B8 of the GOP #i onward in this example, the pictures B1 through B7 (see FIG. 10) preceding the picture B8 on display are not ordinarily required to be decoded. However, decoding the picture B8 requires referencing pictures P6 and P9; decoding the picture P9 requires referencing the picture P6; and decoding the picture P6 requires referencing the picture I3.

Figure 11:
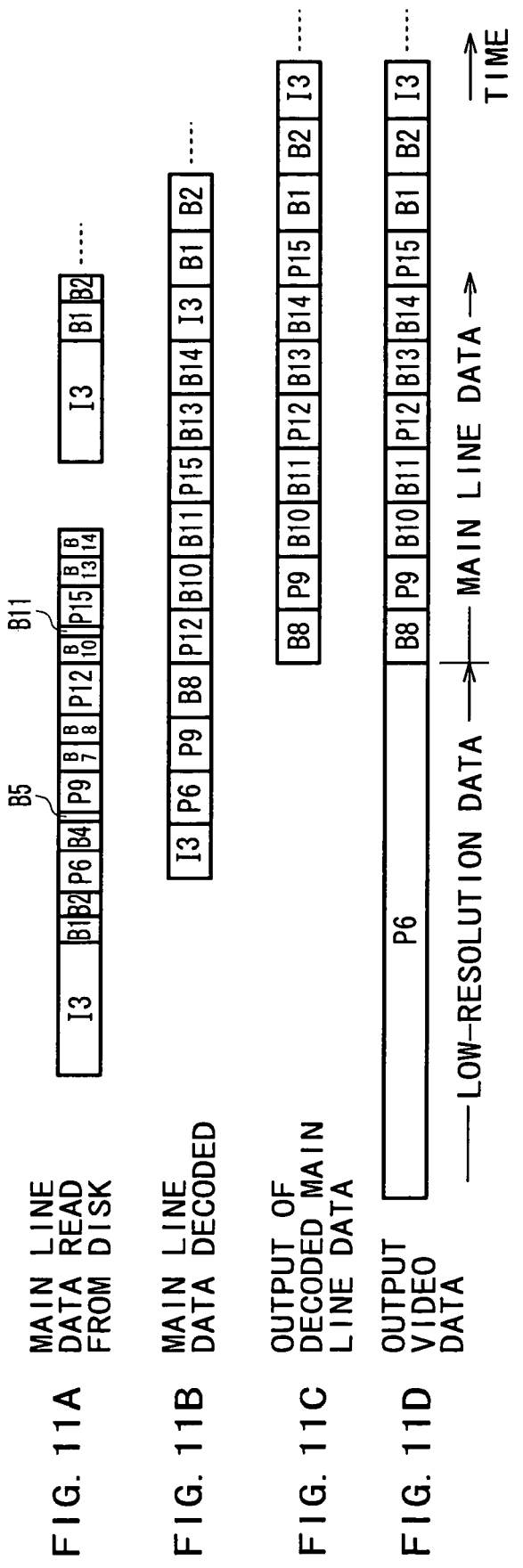
FIGS. 11A, 11B, 11C and 11D are schematic views depicting how an order to start reproduction from a picture B8 causes the corresponding main line data to be read from an optical disk and displayed on a display device.

For that reason, as shown in FIG. 11B, the main decoder 4 decodes consecutively the pictures I3, P6 and P9 before decoding the picture P8 of the GOP #i. Thereafter the main decoder 4 decodes the picture P8 and subsequent pictures in the decoding sequence discussed above by referring to FIG. 10. The main decoder 4 then feeds the picture B8 and subsequent pictures of the GOP #i to the switch 7 in the display sequence as indicated in FIG. 11C. As a result, if the switch 7 selects the output of the main decoder 4, then the picture B8 and subsequent pictures of the GOP #i are output in the display order to the display device 22 for display, as shown in FIG. 11D.

With reproduction ordered to start from the picture B8 of the GOP #i, the main line data from the picture B8 onward start getting displayed only after the picture I3 and subsequent pictures of the GOP #i have been read; after the pictures I3, P6 and P9 of the GOP #i have been decoded; and after the picture B8 of the GOP #i has been decoded.

Figure 12:
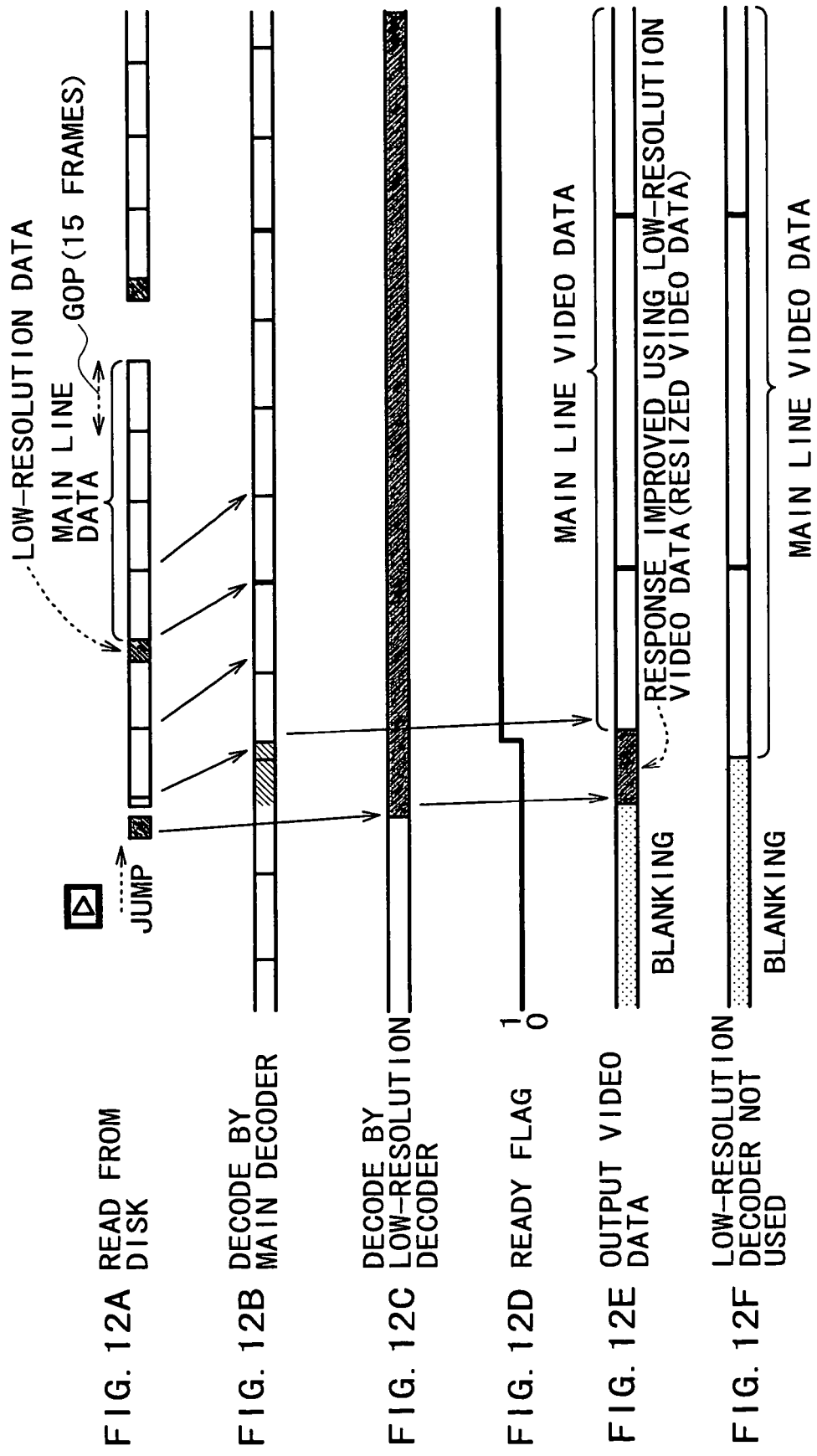
FIGS. 12A, 12B, 12C, 12D, 12E and 12F are explanatory views illustrating how the disk reproducing apparatus works.

The disc reproducing apparatus shown in FIG. 1 is designed to shorten the duration required to display a picture on the display device 22 after a reproduction command is issued as indicated in FIG. 12. That is, the disc reproducing apparatus is structured to improve its response.

More specifically, where reproduction is ordered to start from a particular picture, the low-resolution decoder control block 12 requests low-resolution data from that particular picture onward from the drive control block 14. In turn, the drive control block 14 causes the disk drive 2 to read the requested low-resolution data from the optical disk as shown in FIG. 12A. In keeping with the low-resolution data request from the low-resolution decoder control block 12, the main decoder control block 13 requests from the drive control block 14 the main line data from that picture onward which is needed to decode the picture ordered to be reproduced. In response, the drive control block 14 causes the disk drive 2 to read the requested main line data from the optical disk 1 as depicted in FIG. 12A.

The main decoder 4 decodes the main line data read from the optical disk 1 into the main line video data as shown in FIG. 12B. Concurrently, the low-resolution decoder 5 decodes the low-resolution data read from the optical disk 1 into the low-resolution video data as indicated in FIG. 12C. The low-resolution video data obtained by the low-resolution decoder 5 are resized by the resize block 6 into the resized video data.

As described, the main line data constituting pictures not to be displayed are sometimes decoded in order to decode the pictures whose reproduction has been ordered. That means it may take some time for the target pictures to be decoded after the main line data read operation is started, as shown in FIG. 12B.

Meanwhile, low-resolution data have a lower data rate than main line data and are encoded at a higher speed using illustratively the JPEG standard as mentioned above. It follows that the low-resolution data are read from the optical disk 1 at a higher speed than the corresponding main line data, and are decoded at a higher speed than the latter data as depicted in FIG. 12C.

The main decoder 4 outputs a ready flag of "1" when main line video data are ready to be output and a ready flag of "0" when main line video data are not ready to be output as discussed above. As shown in FIG. 12D, the ready flag output by the main decoder 4 remains at "0" when the main decoder 4 has yet to complete the decoding of the main line data from that picture onward which is designated for reproduction; the ready flag is set to "1" when the decoding process is completed.

As shown in FIG. 12E, if the ready flag is found set to "1," the switch 7 selectively outputs the resized video data (low-resolution video data) obtained through the low-resolution decoder 5 and resize block 6; if the ready flag is found set to "1," the switch 7 selectively outputs the main line video data acquired through the main decoder 4.

As a result, the display device 22 displays the low-resolution video data from the duration a reproduction command is issued until the main decoder 4 is ready to output the main line video data. When the main decoder 4 is ready for the output, the main line video data are displayed on the display device 22.

The low-resolution data can be read at a high speed from the optical disk 1 and decided also at a high speed as described above. It follows that the display device 22 starts displaying video data (low-resolution video data in this case) shortly after the reproduction command is given. When the main decoder 4 is ready to output the main line video data, the display device 22 is switched from the display of the low-resolution video data to the display of the main line video data coming from the main decoder 4.

In the manner described, the disk reproducing apparatus of FIG. 1 can start displaying video data on the display device 22 immediately after reproduction is ordered. The disk reproducing apparatus thus improves its response when arranged and structured according to the invention.

If low-resolution data were not stored on the optical disk 1, the output of main line video data could be started that much faster as shown in FIG. 12F. Still, because it takes longer to read and decode main line data than low-resolution data, the duration required to get the main decoder 4 ready to output the main line video data for display on the display device 22 is far longer than if low-resolution video data were output for display, as illustrated in FIG. 12E. Furthermore, with the main line data alone in use, the pictures needed to decode a specific picture vary depending on that specific picture designated as the first picture to be reproduced; the duration required to get the main decoder 4 ready for data output also varies in like manner. That means the duration required up to the display of video data on the display device 22 varies from one reproduction command to another that may be issued, which can be awkward from the user's viewpoint.

What follows is a more detailed description of the processing for calculating the current clip read ending position and the next clip read starting position in step S42 of FIG. 7. Reference will be made to the flowchart of FIG. 13 for the ensuing description.

Figure 13:
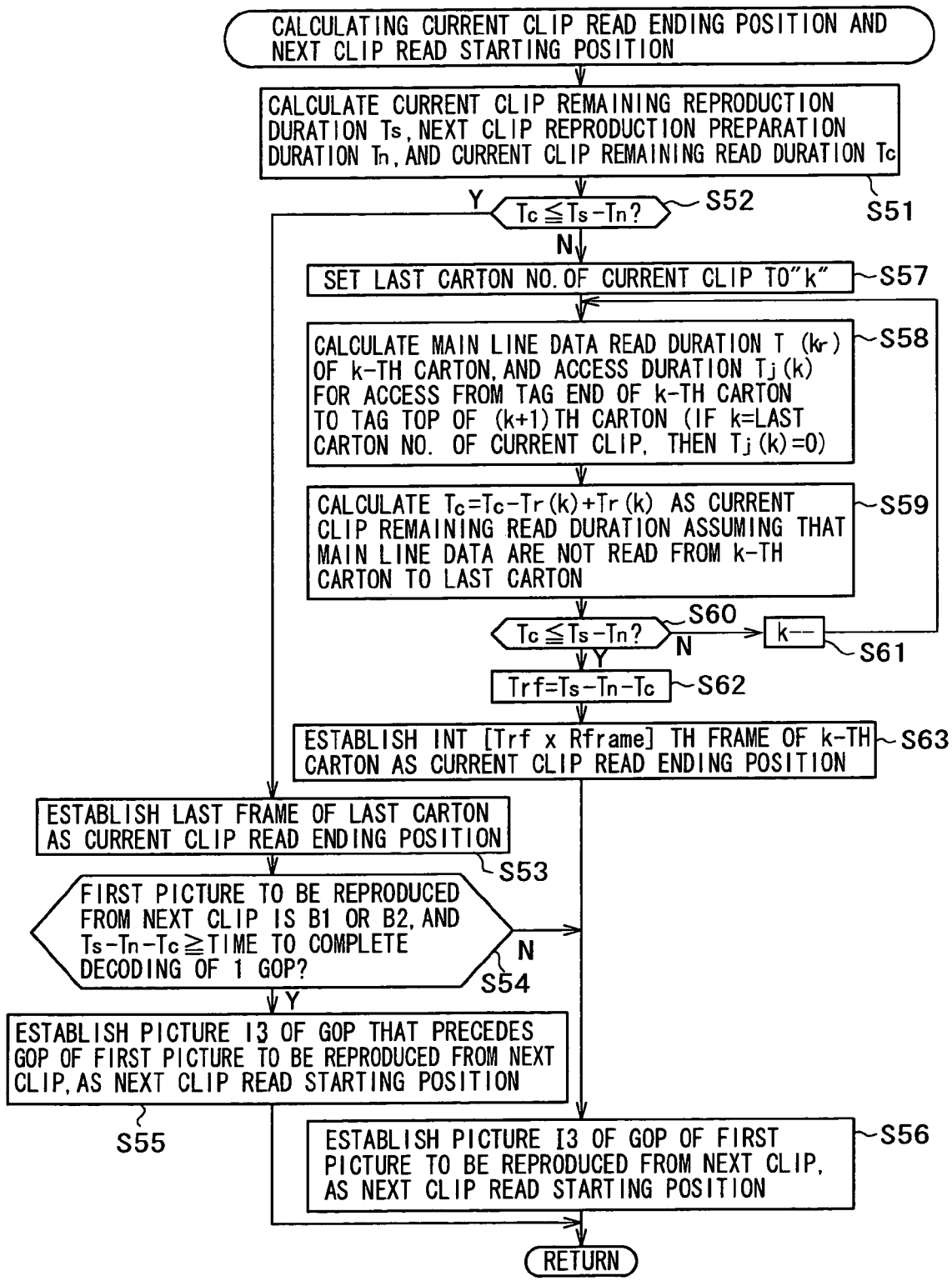
FIG. 13 is a flowchart of steps for implementing the process of calculating a current clip read ending position and a next clip read starting position.

In step S51 of the current clip read ending position/next clip read starting position calculation processing in FIG. 13, the controller 11 (see FIG. 1) calculates a current clip remaining reproduction duration Ts, a next clip reproduction preparation duration Tn, and a current clip remaining read duration Tc.

Figure 14:
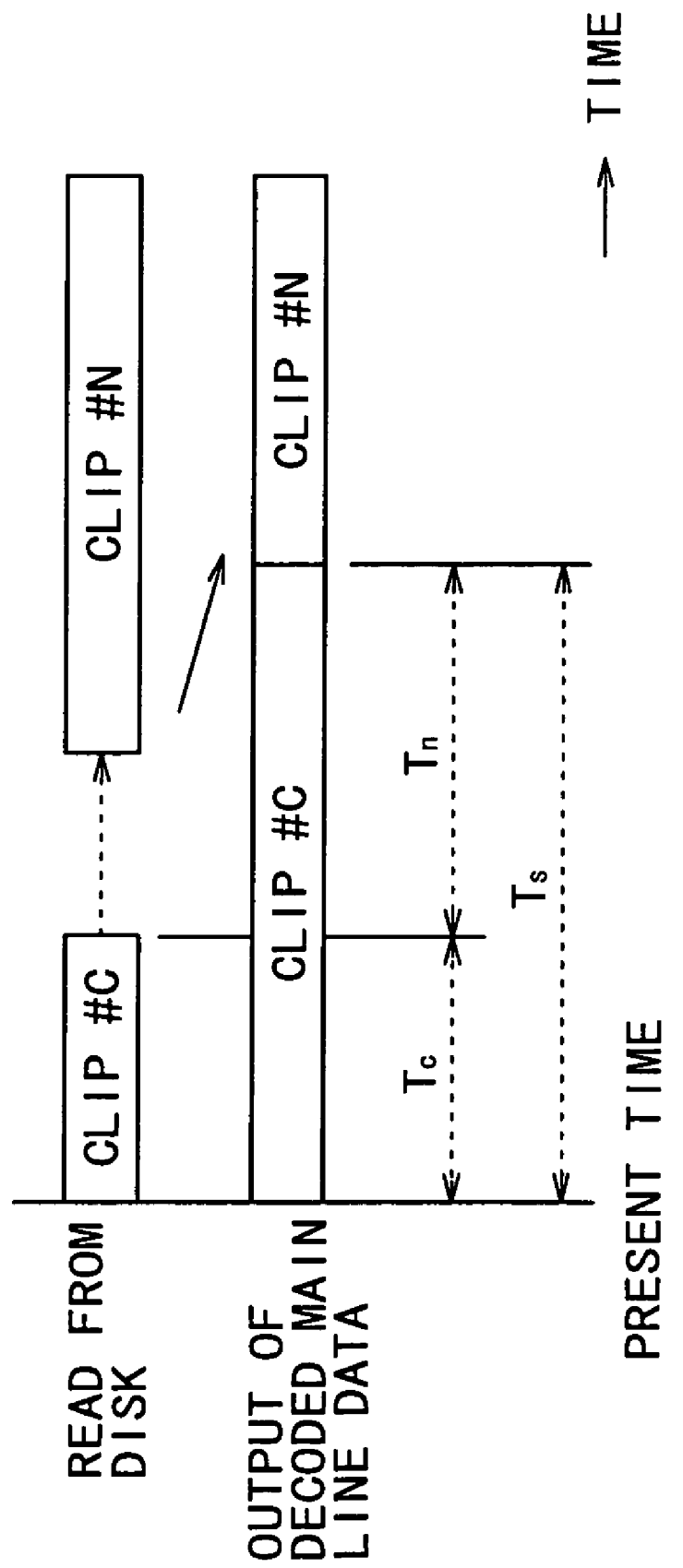
FIG. 14 is an explanatory view describing a current clip remaining reproduction duration Ts, a next clip reproduction preparation duration Tn, and a current clip remaining read duration Tc.

FIG. 14 illustrates how the current clip remaining reproduction duration Ts, the next clip reproduction preparation duration Tn, and the current clip remaining read duration Tc are related to one another. In FIG. 14, a clip #C stands for the current clip, and a clip #N denotes the next clip.

The current clip remaining reproduction duration Ts represents the duration from the present time until the reproduction of the remaining main line data in the current clip #C comes to an end. In other words, the current clip remaining reproduction duration Ts also denotes the duration from the present time until the display of the next clip #N is to be started. If it is assumed that "Tnow" stands for the time code of the currently reproduced picture (frame) from the current clip #C, "Tout" for the time code (out-point) of the last picture of the current clip #C, and "Rframe" for the frame rate (frames per second) in effect, then the current clip remaining reproduction duration Ts (in seconds) is obtained illustratively by calculating the expression (Tout−Tnow)/Rframe.

The next clip reproduction preparation duration Tn denotes the duration from the time the preparations for reproducing the main line data from the next clip #N are started until the preparations are completed.

To start reproducing the main line data from the next clip #N requires that the pickup 2A of the disk drive 2 execute a track jump from the current track on the optical disk 1 to the track where the beginning of the next clip #N is stored. The duration required to perform the track jump is called the long-distance jump duration. To start reproducing the main line data from the next clip #N also requires that the pickup 2A, after making the track jump, wait for an alignment with that position on the rotating optical disk 1 which holds the beginning of the next clip #N. That rotational latency is called the short-distance jump duration. To start reproducing the main line data from the next clip #N further requires reading the data in question from the optical disk 1 and decoding the retrieved data. The duration required to carry out the reading and decoding processes preparatory to outputting the first main line video data of the next clip is called the main line reproduction preparation duration.

The main line reproduction preparation duration includes the duration required to obtain other pictures needed to decode the first picture to be reproduced. However, the main line reproduction preparation duration excludes the duration needed to get GOP pictures other than those of a GOP #i containing the first picture to be reproduced. For example, if the first picture to be reproduced from the next clip #N is, say, the picture B1 of the GOP #i, then decoding that picture B1 requires decoding the picture P15 of the preceding GOP #i−1 followed by decoding of the pictures P12, P9, P6 and I3. In this case, the main line reproduction preparation duration includes the duration required to obtain the picture I3 of the GOP #i but excludes the duration needed to acquire the pictures P15, P12, P9, P6 and I3 of the GOP #i−1 preceding the GOP #1.

To start reproducing the main line data from the next clip #N involves not only the above-described long-distance jump duration, short-distance jump duration, and main line reproduction preparation duration, but also the time to read the tag (see FIG. 2) of the first carton in the next clip #N.

More specifically, as described with reference to FIG. 2 earlier, the meta data in the tag include a storage starting position of the main line data constituting the corresponding carton. That means the main line data of the carton can only be read after the tag (with its meta data) of the carton in question has been read. Although the foregoing description showed the low-resolution decoder control block 12 exerting control to read only the low-resolution data from the tag for purpose of simplification, this is not exactly the case. To be more precise, the low-resolution decoder control block 12 exercises control to read the tag containing the low-resolution data. Thus to start reproducing the main line data from the next clip #N requires reading from the optical disk 1 the tag of the carton including the main line data to be reproduced first.

If the duration required to read a tag is called the tag read duration, then starting the reproduction of the main line data from the next clip #N requires the long-distance jump duration, short-distance jump duration, main line reproduction preparation duration, and tag read duration. It follows that the next clip reproduction preparation duration Tn (in seconds) is calculating by adding up the long-distance jump duration, short-distance jump duration, main line reproduction preparation duration, and tag read duration.

It should be noted that the long-distance jump duration, short-distance jump duration, main line reproduction preparation duration, and tag read duration are assumed to be maximum values applicable to the disk reproducing apparatus of FIG. 1.

The current clip remaining read duration Tc denotes the duration required to read the remaining main line data of the current clip #C from the optical disk 1. It is assume here that "Tc'" stands for the current clip remaining read duration Tc obtained in the previous step S51, "Rratio" for the ratio of the rate of reading data from the optical disk 1 to the rate of reproducing the retrieved data (i.e., read rate divided by reproduction rate), "Σread" for a remaining tag read duration required to read all tags of the remaining cartons in the current clip #C, and "Tbuffer" for a buffer data read duration required to read the (remaining) main line data of the current clip #C from the optical disk 1. On that assumption, the current clip remaining read duration Tc (in seconds) is obtained illustratively by calculating the expression Tc'×Rratio+Σread−Tbuffer.

Returning now to FIG. 13, step S51 is carried out to acquire the current clip remaining reproduction duration Ts, the next clip reproduction preparation duration Tn, and the current clip remaining read duration Tc. Step S51 is followed by step S52 in which the controller 11 determines whether the current clip remaining read duration Tc is equal to or less than a duration Ts−Tn, i.e., the duration obtained by subtracting the next clip reproduction preparation duration Tn from the current clip remaining reproduction duration Ts.

If in step S52 the current clip remaining read duration Tc is found to be equal to or less than the duration Ts−Tn, that means it is possible to start reading the next clip #N after reading to the end the main line data from the current clip #C, in time to the output of the first main line video data from the next clip #N before the time to reproduce the main line video data is reached. In that case, step S52 is succeeded by step S53. In step S53, the controller 11 obtains as the current clip read ending position the frame (last frame) in which is set the out-point of the last carton of the current clip #C. Step S53 is followed by step S54.

In step S54, the controller 11 determines whether the first frame of the main line data to be reproduced from the next clip #N is the picture B1 or B2 and whether a remaining duration Ts−Tn−Tc, i.e., the duration obtained by subtracting the next clip reproduction preparation duration Tn and current clip remaining read duration Tc from the current clip remaining reproduction duration Ts, is equal to or longer than a decode completion duration required to complete the decoding of the preceding one GOP.

The decode completion duration for one GOP refers to the duration period in which to read the main line data in one GOP from the optical disk 1 and to decode at least all I and P pictures of the GOP in question.

If it is determined in step S54 that the first frame of the main line data to be reproduced from the next clip #N is either the picture B1 or the picture B2 and that the remaining duration Ts−Tn−Tc is equal to or longer than the duration required to complete the decoding of one GOP, then step S55 is reached. In step S55, the controller 11 obtains as the next clip read starting position the picture I3 of the GOP preceding the GOP having the first frame (picture B1 or B2) of the main line data to be reproduced from the next clip #N. From step S55, control is returned to the beginning of the processing.

More specifically, if the first frame of the main line data to be reproduced from the next clip #N is found to be the picture B1 or B2, then decoding that picture B1 or B2 requires reference to the picture P15 in the preceding GOP as well as to the pictures P12, P9, P6 and I3. If the remaining duration Ts−Tn−Tc, i.e., the duration obtained by subtracting the next clip reproduction preparation duration Tn and current clip remaining read duration Tc from the current clip remaining reproduction duration Ts, is found equal to or longer than the duration required to complete the decoding of one GOP, that means it is possible to decode the preceding one GOP before decoding the main line data from the next clip #N, in time to the reproduction of the main line data from the next clip #N before the time to reproduce the main line data is reached.

Thus if the first frame of the main line data to be reproduced from the next clip #N is found to be the picture B1 or B2 and if the remaining duration Ts−Tn−Tc is found equal to or longer than the duration required to complete the decoding of one GOP, the controller 11 establishes as the next clip read starting position the picture I3 of the GOP preceding the GOP having the picture B1 or B2 of the main line data to be reproduced first from the next clip #N.

If it is determined in step S54 that the first frame of the main line data to be reproduced from the next clip #N is neither the picture B1 nor the picture B2, or that the first frame of the main line data to be reproduced from the next clip #N is the picture B1 or B2 but the remaining duration Ts−Tn−Tc is less than the duration required to complete the decoding of one GOP, then step S54 is followed by step S56. In step S56, the controller 11 obtains as the next clip read starting position the picture I3, the first frame of the GOP containing the main line data to be reproduced from the next clip #N. From step S56, control is returned to the beginning of the processing.

Mores specifically, if the first frame of the main line data to be reproduced from the next clip #N is a picture other than the picture B1 or B2, that means decoding that particular picture does not require the pictures of other GOPs but always requires the picture I3 of the GOP containing the picture about to be decoded. That is, if the first frame of the main line data to be reproduced from the next clip #N is neither the picture B1 or the picture B2, the controller 11 establishes as the next clip read starting position the first picture I3 of the GOP containing the main line data to be reproduced from the next clip #N.

If the first frame of the main line data to be reproduced from the next clip #N is found to be the picture B1 or B2, then decoding that picture B1 or B2 requires decoding the preceding GOP as discussed above. Where the remaining duration Ts−Tn−Tc is found less than the duration required to complete the decoding of one GOP, that means it is impossible to get reproduction of the main line data from the next clip #N ready before the time to reproduce the main line data, if the preceding GOP needs to be decoded before the decoding of the main line data from the next clip #N.

In such a case where the first frame of the main line data to be reproduced from the next clip #N is the picture B1 or B2 but where the remaining duration Ts−Tn−Tc is less than the duration required to complete the decoding of one GOP, the controller 11 renounces the decoding of the picture B1 or B2 and establishes as the next clip read starting position the first picture I3 of the GOP containing the main line data to be reproduced from the next clip #N.

If the first frame of the main line data to be reproduced from the next clip #N is illustratively the picture B1, the main decoder 4 decodes the pictures I3, B1, B2, P6, B4, B5, P9, B7, B8, P12, B10, etc., in that order. If the picture I3 of the GOP containing the main line data to be reproduced first from the next clip #N is established as the next clip read starting position, the GOP preceding the next clip #N will not be decoded. That means it is impossible to decode the pictures B1 and B2 of the first GOP in the next clip #N. For that reason, when it is time to output the pictures B1 and B2, the main decoder 4 outputs the ready flag of "0" indicating that the preparations for the output have yet to be complete; when it is time to output the picture I3 and subsequent pictures in the display sequence, the main decoder 4 outputs the ready flag of "0" indicating that the preparations for the output are complete.

If in step S52 the current clip remaining read duration Tc is found longer than the duration Ts−Tn, that means it is impossible to start reading the next clip #N after reading to the end the main line data from the current clip #C, in time for the output of the first main line video data from the next clip #N before the time to reproduce the main line video data is reached. That is, it is impossible to prepare the reproduction of the main line data from the next clip #N before the time to start the reproduction. In that case, step S52 is followed by step S57. In step S57, the controller 11 initializes a variable "k" using the last carton number, i.e., the carton number representing the last carton of the current clip #C. Step S57 is followed by step S58.

Carton numbers are typically made of sequential integral numbers starting from 1 (1, 2, etc.). The first and subsequent cartons of a clip are sequentially numbered from 1 upward. In the description that follows, the carton in the k-th place from the top of the clip may be referred to as the k-th carton.

In step S58, the controller 11 calculates a main line data read duration Tr(k), i.e., the duration required to read the main line data in the k-th carton of the current clip #C from the optical disk 1, and an access duration Tj(k), which is the duration required for gaining access from the tag end of the k-th carton of the current clip #C to the tag top of the (k+1)th carton of the clip #C. If the variable "k" denotes the last carton number, that means the (k+1)th carton does not exist in the current clip #C. In that case, the access duration Tj(k) is regarded as zero.

After the main line data read duration Tr(k) and access duration Tj(k) are obtained with regard to the k-th carton of the current clip #C in step S58 as described above, step S59 is reached. In step S59, the controller 11 calculates the current clip remaining read duration Tc on the assumption that the main line data are not read from the k-th carton to the last carton of the current clip #C (i.e., only the tags are read).

If it is assumed that no main line data are read from the k-th carton of the current clip, that means there is no need to read the main line data from the k-th carton whereas access is needed from the tag of the k-th carton to the tag of the (k+1)th carton. Suppose that the current clip remaining read duration Tc represents the duration required to read the remaining main line data in the current clip #C from the optical disk 1 when the main line data are not to be read from the (k+1)th carton to the last carton of the current clip #C. In that case, the current clip remaining read duration Tc with no main line data read from the k-th carton to the last carton of the current clip #C is calculated by subtracting the duration Tr(k) required to read the main line data in the k-th carton of the current clip #C, from the current clip remaining read duration Tc obtained in the previous step S59 with no main line data read from the (k+1)th carton to the last carton, and by adding to the result of the subtraction the access duration Tj(k) required for access from the tag of the k-th carton to the (k+1)th tag.

In other words, the equation Tc=Tc−Tr(k)+Tj(k) is used to calculate the current clip remaining read duration Tc in effect when the main line data are not to be read from the k-th carton to the last carton of the current clip #C.

It should be noted that in obtaining the current clip remaining read duration Tc on the assumption that no main line data are read from the k-th carton to the last carton of the current clip #C, the access duration Tj(k) required for access from the tag of the k-th carton to the tag of the (k+1)th carton is added to the result of the subtraction. That is because this embodiment of the invention always reads the tags of the cartons constituting each clip.

Step S59 is followed by step S60. In step S60, as in step S52, the controller 11 determines whether the current clip remaining read duration Tc is equal to or less than the duration Ts−Tn obtained by subtracting the next clip reproduction preparation duration Tn from the current clip remaining reproduction duration Ts.

If in step S60 the current clip remaining read duration Tc is found longer than the duration Ts−Tn, that means it is impossible to prepare reproduction of the main line data from the next clip #N before the time to start the reproduction, even with no main line data read from the k-th carton to the last carton of the current clip #C. In that case, step S61 is reached in which the controller 11 decrements the variable "k" by 1. From step S61, control is returned to step S58 and the subsequent steps are repeated.

If in step S60 the current clip remaining read duration Tc is found equal to or less than the duration Ts−Tn obtained by subtracting the next clip reproduction preparation duration Tn from the current clip remaining reproduction duration Ts, that means it is possible to prepare reproduction of the main line data from the next clip #N before the time to start the reproduction, with no main line data read from the k-th carton to the last carton of the current clip #C. In this case, step S60 is succeeded by step S62. In step S62, the controller 11 sets to a variable Trf the duration Ts−Tn−Tc obtained by subtracting the next clip reproduction preparation duration Tn and current clip remaining read duration Tc from the current clip remaining reproduction duration Ts. Step S62 is followed by step S63.

The variable Trf in which the duration Ts−Tn−Tc is set represents what may be called a time margin provided so that, with the main line data inhibited from being read from the first frame of the k-th carton to the last frame of the last carton in the current clip #C, the reproduction of the main line data from the next clip #N is made ready before the time to start main line data reproduction from the next clip #N is reached. In other words, if the main line data are inhibited from getting read from the first frame of the k-th carton to the last frame of the last carton in the current clip #C and if no processing is carried out during the duration represented by the variable Trf, the preparations for reproducing the main line data from the next clip #N are still completed before the time to start main line data reproduction from the next clip #N is reached.

Suppose that the frame rate is denoted by Rframe as mentioned above and the maximum integer number in brackets [ ] by "INT [ ]," and that no main line data are to be read from the first frame of the k-th carton to the last frame of the last carton in the current clip #C. In that case, with the main line data read from as many as INT[Trf×Rframe] frames on the optical disk 1 and decoded, the reproduction of the main line data from the next clip #N is still made ready before the time to start main line data reproduction from the next clip #N is reached.

Therefore, the controller 11 in step S63 of FIG. 13 establishes as the current clip read ending position the place which is INT[Trf×Rframe] frames away from the first frame of the k-th carton in the current clip #C.

Step S63 is followed by step S56 in which the controller 11 obtains as the next clip read starting position the picture I3, the first frame of the GOP containing the main line data to be reproduced from the next clip #N as described above. From step S56, control is returned to the beginning of the processing.

As described, if no main line data are to be read from the k-th carton to the last carton in the current clip #C, then the picture I3, the first frame of the GOP containing the main line data to be reproduced from the next clip #N, is set as the next clip read starting position regardless of whether the first frame of the main line data to be reproduced from the next clip #N is the picture B1, B2, or any other picture.

If the first frame of the main line data to be reproduced from the next clip #N is the picture B1 or B2, it is ordinarily preferable to set the picture I3 of the GOP preceding the next clip #N as the next clip read starting position in order to decode the picture B1 or B2. In this case, with no main line data read from the k-th carton to the last carton in the current clip #C, there is not enough time to read the picture I3 of the GOP preceding the next clip #N.

Thus where no main line data are read from the k-th carton to the last carton in the current clip #C, the controller 11 gives up on reading data from the picture I3 of the GOP preceding the next clip #N. Instead, the controller 11 establishes as the next clip read starting position the picture I3, the first frame to be reproduced from the next clip #N, regardless of what the first picture frame is of the main data to be reproduced from the next clip #N.

In this case, the picture I3 in the GOP having the first frame (picture) of the main line data to be reproduced from the next clip #N is always established as the next clip read starting position. Thus if the first frame of the main line data to be reproduced from the next clip #N is illustratively the picture B1 or B2, then that frame cannot be decoded. For that reason, when it is time to output the picture B1 or B2, the main decoder 4 outputs the ready flag of "0" indicating that the picture is not ready to be output; when it is time to output the picture I3 and subsequent pictures in the display sequence, the main decoder 4 outputs the ready flag of "1" indicating that the preparations for the output are complete.

The current clip remaining reproduction duration Ts, next clip reproduction preparation duration Tn, and current clip remaining read duration Tc are first obtained in the manner described above during the current clip read ending position/next clip read starting position calculation processing. After the duration values Ts, Tn and Tc are thus acquired, the current clip read ending position and the next clip read starting position are obtained accordingly.

The current clip read ending position/next clip read starting position calculation processing, when carried out as described, ensures that drop-outs of main line data are minimized and that the main line data reproduction proceeds uninterrupted.

Figure 15:
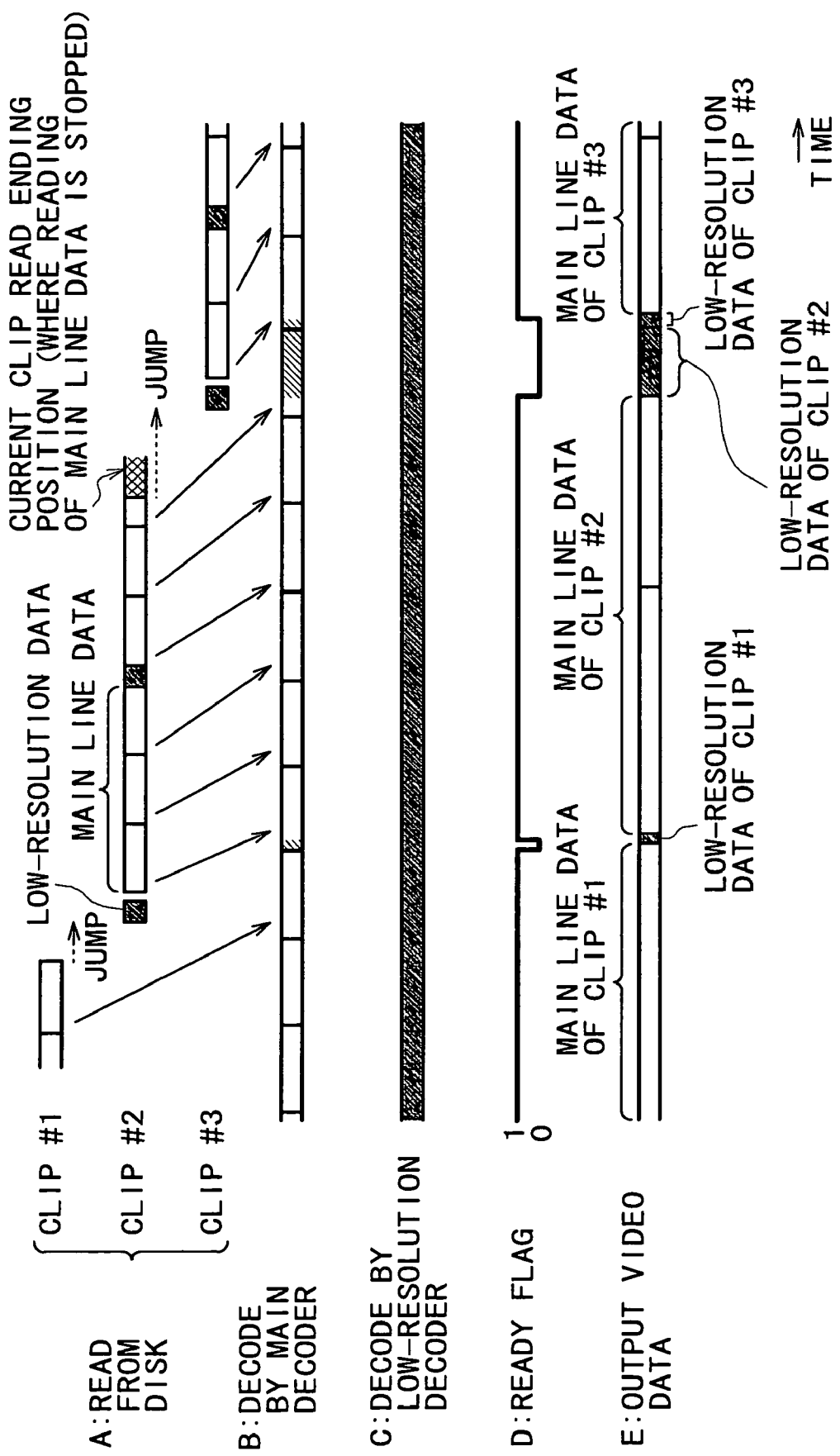
FIG. 15 is another explanatory view illustrating how the disk reproducing apparatus works.
Figure 16:
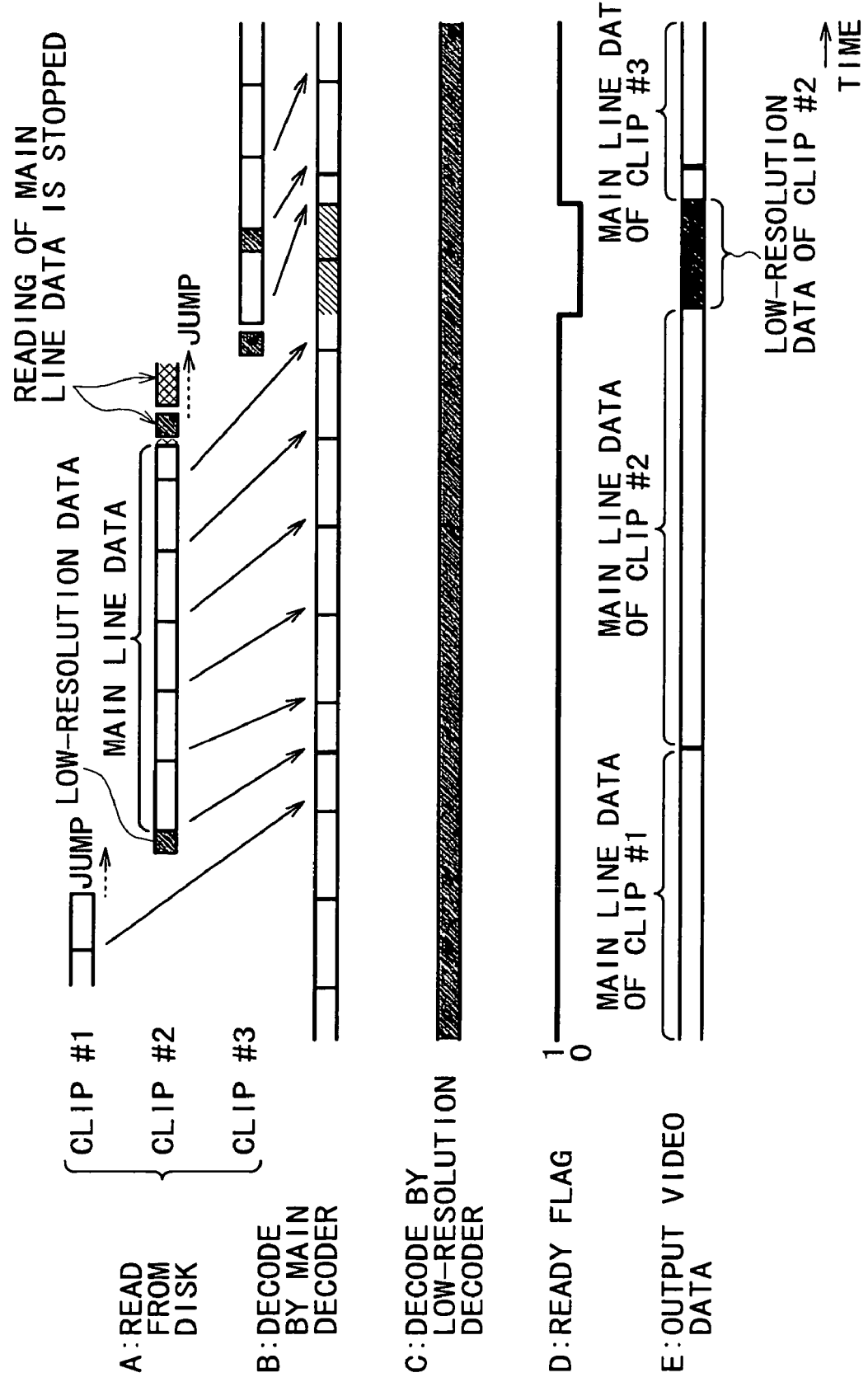
FIG. 16 is another explanatory view illustrating how the disk reproducing apparatus works.

What follows is a more detailed description of the disk reproducing apparatus shown in FIG. 1. Reference will be made to FIGS. 15 and 16 for the ensuing description.

FIG. 15 illustrates how the disk reproducing apparatus of FIG. 1 reproduces clips #1, #2 and #3 from the optical disk 1, in that order. In the example of FIG. 15, the low-resolution decoder control block 12 first requests the low-resolution data of the clip #1 from the drive control block 14. In turn, the drive control block 14 causes the disk drive 2 to read the requested low-resolution data from the optical disk 1, as shown in Subfigure A of FIG. 15. In keeping with the low-resolution data request made by the low-resolution decoder control block 12, the main decoder control block 13 requests from the drive control block 14 the main line data of the clip #1 whose reproduction is being ordered. In response, the drive control block 14 causes the disk drive 2 to read the requested main line data from the optical disk 1, as depicted in Subfigure A.

The main decoder 4, as shown in Subfigure B, decodes the main line data of the clip #1 read from the optical disk 1 into the corresponding main line video data. Concurrently, the low-resolution decoder 5 decodes the low-resolution data of the clip #1 read from the optical disk 1 into the corresponding low-resolution video data as illustrated in Subfigure C. The low-resolution video data obtained by the low-resolution decoder 5 are resized by the resize block 6 into the resized video data.

Because of the above-mentioned assumption that the tags containing low-resolution data are always read from the optical disk 1, the low-resolution decoder 5 continuously decodes the low-resolution data from the clips and feeds the decoded low-resolution data to the switch 7 through the resize block 6. With that feature noted and, no further reference will be made to the reading and decoding of low-resolution data in the ensuing description in connection with FIG. 15.

After starting to decode the main line data of the clip #1, the main decoder 4 outputs the ready flag of "1" as indicated in Subfigure D. As a result, the switch 7 selectively outputs the main line video data of the clip #1 obtained by the main decoder 4, as illustrated in Subfigure E.

Suppose now that the first picture to be reproduced from the clip #2 is the picture B1; that the current clip remaining read duration Tc is equal to or less than the duration Ts−Tn, i.e., the duration obtained by subtracting the next clip reproduction preparation duration Tn from the current clip remaining reproduction duration Ts; and that the duration Ts−Tn−Tc, i.e., the duration acquired by subtracting the next clip reproduction preparation duration Tn and the current clip remaining read duration Tc from the current clip remaining reproduction duration Ts, is less than the time to complete the decoding of one GOP. In this case, the current clip read ending position for the clip #1 (current clip) is made to coincide with the last frame of the last carton in the clip #1 (see step S63 in FIG. 13), and the next clip read starting position for the clip #2 (next clip) is established as the picture I3 of the GOP to be reproduced first from the clip #2 (see step S56 in FIG. 13).

In the case above, when the main line data have all been read from up to the last frame of the last carton in the clip #1 from the optical disk 1, the reading of main line data is started from the picture I3 of the GOP to be reproduced first from the clip #2 on the optical disk 1, as shown in Subfigure A.

Where the main line data are read starting from the picture I3 of the GOP to be reproduced first from the clip #2 on the optical disk 1, it is impossible to decode the pictures B1 and B2 of the GOP to be reproduced first, as discussed above. In this case, decoding can be made to start from the picture I3.

As described, the main line data are read from up to the last frame of the clip #1 on the optical disk 1, and the retrieved data are decoded by the main decoder 4. After the reading of the main line data from up to the last frame of the clip #1, the pickup 2A makes a jump to the next clip read starting position, i.e., to the picture I3 of the GOP to be reproduced first from the clip #2, and starts reading data from the picture I3 as shown in Subfigure A. In this case, the main decoder 4 cannot decode the pictures B1 and B2 of the GOP to be reproduced first from the clip #2 as described above but can decode the main line data starting from the picture I3. Thus as indicated in Subfigure D, when it is time to output the pictures B1 and B2 of the GOP to be reproduced first from the clip #2, the main decoder 4 sets the ready flag to "0"; when it is time to output the picture I3 later on, the main decoder 4 sets the ready flag to "1."

As a result, when it is time to output the pictures B1 and B2 of the GOP to be reproduced first from the clip #2, the switch 7 selectively outputs the low-resolution data of the pictures B1 and B2 supplied by the low-resolution decoder 5 as shown in Subfigure E. Later, when it is time to output the picture I3, the switch 7 selectively outputs the main line video data coming from the main decoder 4.

In this case, the pictures B1 and B2 of the clip #2 cannot be decoded because there is not enough time to decode the preceding GOP needed to decode the first pictures B1 and B2. Instead, the low-resolution data (i.e., resized video data derived therefrom) of the pictures B1 and B2 are displayed on the display device 22. This prevents disruptions of display on the display device 22.

When it is time to output the picture I3 of the GOP to be reproduced first from the clip #2, the main decoder 4 sets the ready flag to "1." Thereafter, the main decoder 4 continuously decodes the main line data of the clip #2. In turn, the switch 7 selectively outputs the main line video data of the clip #2 obtained by the main decoder 4 carrying out the decoding, as shown in Subfigure E.

Illustratively, it is assumed here that the first picture to be reproduced from the clip #3 is the picture B1. It is also assumed that the seek from the clip #2 to the clip #3 takes longer than the seek from the clip #1 to the clip #2, so that the current clip remaining read duration Tc is longer than the duration Ts−Tn, i.e., the duration obtained by subtracting the next clip reproduction preparation duration Tn from the current clip remaining reproduction duration Ts. On that assumption, it is further assumed that after the main line data have been read from up to the end of the clip #2 (current clip), the clip #3 (next clip) starts being read and the decoding of the main line data from the clip #3 is started. In that case, it is impossible to be ready to output the main line video data to be reproduced first from the clip #3 before the time to start reproduction of the main line video data from the clip #3 is reached. In other words, it is impossible to prepare the reproduction of the main line data from the clip #3 before the time to start main line data reproduction from the clip #3 is reached. In order to bypass this bottleneck, the current clip read ending position for the clip #2 is obtained in such a manner that the reproduction of the main line data from the clip #3 is prepared in time (see step S63 in FIG. 13). The next clip read starting position for the clip #3 is then established as the picture I3 of the GOP to be reproduced first from the clip #3 (see step S56 in FIG. 13).

In the case above, the main line data will not be read from up to the last frame of the last carton in the clip #2 on the optical disk 1. As shown in Subfigure A, the reading of the main line data from the clip #2 on the optical disk 1 is stopped in time to let the reproduction of the main line data from the clip #3 take place, i.e., stopped in the current clip read ending position.

After the main decoder 4 has decoded the main line data up to the end of the clip #2 on the optical disk 1, i.e., up to the current clip read ending position, the main decoder 4 cannot decode any more main line data of the clip #2 beyond the current clip read ending position. Therefore the main decoder 4 sets the ready flag to "0" when it is time to output the frames of the main line data that cannot be decoded, as shown in Subfigure D.

As a result, as depicted in Subfigure E, the switch 7 selectively outputs the decoded main line data of the clip #2 supplied by the main decoder 4 until the current clip read ending position of the clip #2 is reached. Beyond the current clip read ending position of the clip #2, the switch 7 selectively outputs the low-resolution video data coming from the low-resolution decoder 5.

In this case, there is not enough time to decode the main line data up to the end of the clip #2. What can be output here is only the main line data decoded up to the current clip read ending position of the clip #2. Beyond the current clip read ending position of the clip #2, the low-resolution video data (i.e., resized video data derived therefrom) are displayed on the display device 22. This also prevents disruptions of display on the display device 22.

When the reading of the main line data from the clip #2 is stopped in the current clip read ending position, the main line data of the picture I3 in the GOP to be reproduced first from the clip #3 start getting read from the optical disk 1. That is, the reading of the main line data is started from the next clip read starting position of the clip #3, as illustrated in Subfigure A.

Where the main line data are read starting from the picture I3 in the GOP to be reproduced first from the clip #3 on the optical disk 1, the pictures B1 and B2 of the GOP to be first reproduced cannot be decoded, as described above. Instead, the main line data can be decoded starting from the picture I3.

It follows that the main decoder 4 sets the ready flag to "0" when it is time to output the frame of the main line data in the current clip read ending position. Later, when it is time to output the pictures B1 and B2 of the GOP to be reproduced first from the clip #2, the ready flag is left unchanged at "0." When it is time to output the picture I3 later on, the main decoder 4 sets the ready flag to "1."

As a result, when it is time to output the pictures B1 and B2 of the GOP to be reproduced first from the clip #3, the switch 7 selectively outputs the low-resolution video data of the pictures B1 and B2 supplied by the low-resolution decoder 5, as shown in Subfigure E. When it is time to output the picture I3 later on, the switch 7 selectively outputs the main line video data coming from the main decoder 4.

In that case, there is not enough time to decode the preceding GOP needed to decode the pictures B1 and B2, so that the pictures B1 and B2 cannot be decoded. Instead, the low-resolution video data (i.e., resized video data derived therefrom) of the pictures B1 and B2 are displayed on the display device 22. This prevents disruptions of display on the display device 22.

FIG. 16, as in the case of FIG. 15, illustrates how the disk reproducing apparatus of FIG. 1 reproduces clips #1, #2 and #3 from the optical disk 1, in that order. In the example of FIG. 16, the low-resolution decoder control block 12 first requests the low-resolution data of the clip #1 from the drive control block 14. In turn, the drive control block 14 causes the disk drive 2 to read the requested low-resolution data from the optical disk 1, as shown in Subfigure A. In keeping with the low-resolution data request made by the low-resolution decoder control block 12, the main decoder control block 13 requests from the drive control block 14 the main line data of the clip #1 whose reproduction is being ordered. In response, the drive control block 14 causes the disk drive 2 to read the requested main line data from the optical disk 1, as depicted in Subfigure A.

The main decoder 4, as shown in Subfigure B, decodes the main line data of the clip #1 read from the optical disk 1 into the corresponding main line video data. Concurrently, the low-resolution decoder 5 decodes the low-resolution data of the clip #1 read from the optical disk 1 into the corresponding low-resolution video data as illustrated in Subfigure C. The low-resolution video data obtained by the low-resolution decoder 5 are resized by the resize block 6 into the resized video data.

Because of the above-mentioned assumption that the tags containing low-resolution data are always read from the optical disk 1, the low-resolution decoder 5 continuously decodes the low-resolution data from the clips and feeds the decoded low-resolution data to the switch 7 through the resize block 6. With that feature noted and understood, no further reference will be made to the reading and decoding of low-resolution data in the ensuing description in connection with FIG. 16.

After starting to decode the main line data of the clip #1, the main decoder 4 outputs the ready flag of "1" as indicated in Subfigure D. As a result, the switch 7 selectively outputs the main line video data of the clip #1 obtained by the main decoder 4, as illustrated in Subfigure E.

Suppose now that the first picture to be reproduced from the clip #2 is a picture other than the picture B1 or B2; and that the current clip remaining read duration Tc is equal to or less than the duration Ts–Tn, i.e., the duration obtained by subtracting the next clip reproduction preparation duration Tn from the current clip remaining reproduction duration Ts. In this case, the current clip read ending position for the clip #1 (current clip) is made to coincide with the last frame of the last carton in the clip #1 (see step S53 in FIG. 13), and the next clip read starting position for the clip #2 (next clip) is established as the picture I3 of the GOP to be reproduced first from the clip #2 (see step S56 in FIG. 13).

In the case above, when the main line data have all been read from up to the last frame of the last carton in the clip #1 from the optical disk 1, the reading of main line data is started from the picture I3 of the GOP to be reproduced first from the clip #2 on the optical disk 1, as shown in Subfigure A.

Because the first picture to be reproduced from the clip #2 is a picture other than the picture B1 or B2, it is possible to decode the main line data starting from the first picture to be reproduced from the clip #2 even if the main line data are read from the optical disk 1 starting from the picture I3 of the GOP to be reproduced first from the clip #2.

As described, the main line data are read from up to the last frame of the clip #1 on the optical disk 1, and the retrieved data are decoded by the main decoder 4. After the reading of the main line data from up to the last frame of the clip #1, the pickup 2A makes a jump to the next clip read starting position, i.e., to the picture I3 of the GOP to be reproduced first from the clip #2, and starts reading data from the picture I3 as shown in Subfigure A. In this case, the main decoder 4 can decode the picture of the GOP to be reproduced first from the clip #2 as described above. Thus the ready flag is left unchanged at "1" as shown in Subfigure D.

As a result, when it is time to output the main line data from the clip #1 up to the clip #2, the switch 7 continuously selects the main line video data being fed by the main decoder 4, as shown in Subfigure E.

As described, if there is enough time to reproduce the main line data from the beginning of the clip #2 with the main line data of the clips #1 and #2 decoded, the switch 7 does not select the decoded low-resolution data from the low-resolution decoder 5. Instead, the switch 7 continuously selects the decoded main line data coming from the main decoder 4.

Thereafter, the main decoder 4 keeps decoding the main line data from the clip #2. The switch 7 selectively outputs the main line video data of the clip #2 obtained by the main decoder 4 carrying out the decoding process, as shown in Subfigure E.

Illustratively, it is assumed here that the first picture to be reproduced from the clip #3 is a picture other than the picture B1 or B2. It is also assumed that the current clip remaining read duration Tc is longer than the duration Ts−Tn, i.e., the duration obtained by subtracting the next clip reproduction preparation duration Tn from the current clip remaining reproduction duration Ts. On that assumption, it is further assumed that after the main line data have been read from up to the end of the clip #2 (current clip), the clip #3 (next clip) starts being read and the decoding of the main line data from the clip #3 is started. In that case, it is impossible to be ready to output the main line video data to be reproduced first from the clip #3 before the time to start reproduction of the main line video data from the clip #3 is reached. In other words, it is impossible to prepare the reproduction of the main line data from the clip #3 before the time to start main line data reproduction from the clip #3 is reached. In order to bypass this bottleneck, the current clip read ending position for the clip #2 is obtained in such a manner that the reproduction of the main line data from the clip #3 is prepared in time (see step S63 in FIG. 13). The next clip read starting position for the clip #3 is then established as the picture I3 of the GOP to be reproduced first from the clip #3 (see step S56 in FIG. 13).

In the case above, the main line data will not be read from up to the last frame of the last carton in the clip #2 on the optical disk 1. As shown in Subfigure A, the reading of the main line data from the clip #2 on the optical disk 1 is stopped in time to let the reproduction of the main line data from the clip #3 take place, i.e., stopped in the current clip read ending position.

In the example of FIG. 16, the seek from the clip #2 to the clip #3 takes longer than in the example of FIG. 15. That means the current clip read ending position for the clip #2 in FIG. 16 comes ahead of the corresponding position in FIG. 15 (in the sequence of reading data from the optical disk 1). In the example FIG. 15, the current clip read ending position for the clip #2 illustratively coincides with any one of the main line data frames in the last carton of the clip #2. In the example of FIG. 16, by comparison, the current clip read ending position for the clip #2 illustratively coincides with any one of the main line data frames in the carton preceding the last carton of the clip #2. As a result, the main line data will not be read from the single carton of the clip #2 in the example of FIG. 15, whereas the reading of the main line data will not occur from the two cartons of the clip #2 in the example FIG. 16. However, the tags are read even where no main line data are read from the cartons as mentioned above. Thus in the example of FIG. 16, after the reading of the main line data is stopped from the carton preceding the last carton of the clip #2, the tag is read which contains the low-resolution data in the last carton (see Subfigure A of FIG. 16).

After the main decoder 4 has decoded the main line data up to the end of the clip #2 on the optical disk 1, i.e., up to the current clip read ending position, the main decoder 4 cannot decode any more main line data of the clip #2 beyond the current clip read ending position. Therefore the main decoder 4 sets the ready flag to "0" when it is time to output the frames of the main line data that cannot be decoded, as shown in Subfigure D.

As a result, as depicted in Subfigure E, the switch 7 selectively outputs the decoded main line data of the clip #2 supplied by the main decoder 4 until the current clip read ending position of the clip #2 is reached. Beyond the current clip read ending position of the clip #2, the switch 7 selectively outputs the low-resolution video data coming from the low-resolution decoder 5.

In this case, there is not enough time to decode the main line data up to the end of the clip #2. What can be output here is only the main line data decoded up to the current clip read ending position of the clip #2. Beyond the current clip read ending position of the clip #2, the low-resolution video data (i.e., resized video data derived therefrom) are displayed on the display device 22. This prevents disruptions of display on the display device 22.

When the reading of the main line data from the clip #2 is stopped in the current clip read ending position, the main line data of the picture I3 in the GOP to be reproduced first from the clip #3 start getting read from the optical disk 1. That is, the reading of the main line data is started from the next clip read starting position of the clip #3, as shown in Subfigure A.

In the case above, the first picture to be reproduced from the clip #3 is a picture other than the picture B1 or B2. That means the first picture to be reproduced can be decoded when the picture I3 of the GOP to be reproduced first from the clip #3 starts getting read from the optical disk 1.

The main decoder 4 thus sets the ready flag to "0" when it is time to output the frame of the main line data from the current clip read ending position. When it is time to output the first picture to be reproduced from the clip #2, the main decoder 4 sets the ready flag to "1."

As a result, when it is time to output the first picture to be reproduced from the clip #3, the switch 7 selectively outputs the main line video data supplied by the main decoder 4, as shown in Subfigure E.

As described, when the target of reproduction is switched from the current clip to the next clip, the disk reproducing apparatus of FIG. 1 reads main line data from the current clip and from the next clip on the optical disk 1 in such a manner that reproduction of the next clip is, prepared in time. Where the frames of the main line data cannot be read from the optical disk 1, or where a main line data frame is read but cannot be decoded because the main line data of the frame needed to decode that main line data frame cannot be read, the disk reproducing apparatus selects the corresponding low-resolution data having been decoded in place of the main line data in question. The decoded low-resolution data are displayed on the display device 22 to ensure the continuity of display.

In the example of FIG. 16, the main line data in the first carton of the clip #3 have a very small number of frames. In such a case, it is possible to suppress the reading of main line data from the first carton of the clip #3 while letting the display device 22 display instead the corresponding low-resolution video data (i.e., resized video data derived therefrom) obtained by the low-resolution decoder 5.

As described, the disk reproducing apparatus of FIG. 1 can improve its response as measured from the time a reproduction command is issued until the requested data are reproduced. What the inventive apparatus does is first to output selectively low-resolution data read from the optical disk 1 until main line data are ready to be output. Once the main line data are readied for the output, the apparatus selectively outputs the main line data. In addition to this feature, the disk reproducing apparatus is capable of what is known as error concealment.

Figure 17:
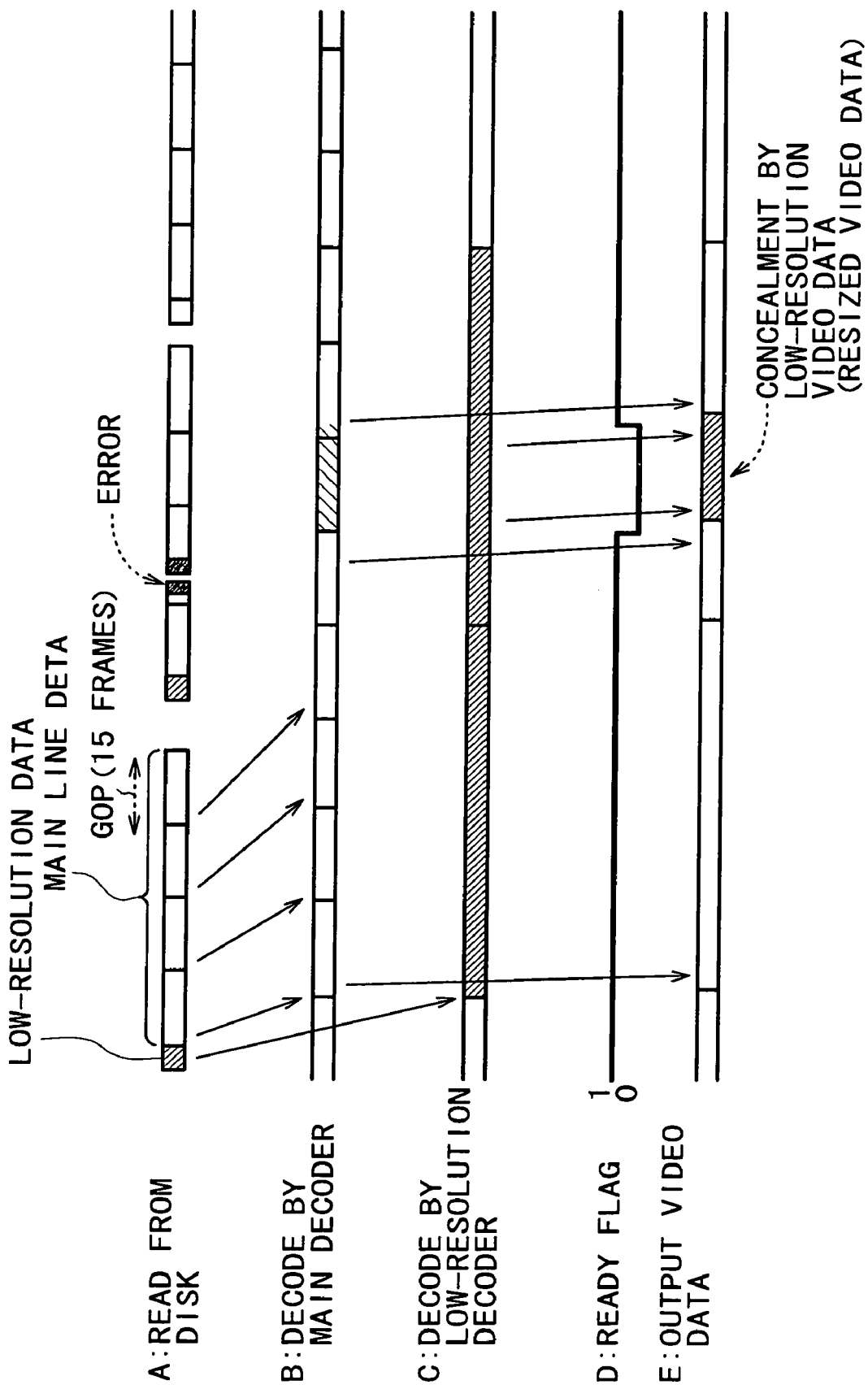
FIG. 17 is an explanatory view illustrating how error concealment is carried out.

What follows is a description of error concealment carried out by the disk reproducing apparatus of FIG. 1. Reference will be made to FIG. 17 for the ensuing description.

In operation, the disk drive 2 reads successively low-resolution data and main line data in units of cartons from the optical disk 1 under control of the drive control block 14, as shown in Subfigure A.

The main decoder 4 decodes the main line data read from the optical disk 1 into main line video data as depicted in Subfigure B. Concurrently, the low-resolution decoder 5 decodes the low-resolution data read from the optical disk 1 into low-resolution video data as illustrated in Subfigure C. The low-resolution video data obtained by the low-resolution decoder 5 are resized by the resize block 6 into resized video data.

Meanwhile, where it is possible to output the main line data (i.e., the main line video data obtained by decoding the main line data), the main decoder 4 outputs the ready flag of "1" as indicated in Subfigure D. In this case, the switch 7 selectively outputs the main line video data acquired by the main decoder 4 as shown in Subfigure E.

Suppose now that the main line data read from the optical disk 1 contain an error as depicted in Subfigure A and that the main line data associated with the error cannot be decoded and output as illustrated in Subfigure B. In that case, the main decoder 4 sets the ready flag to "0" over the frames of the main line data that cannot be decoded, as shown in Subfigure D.

In the case above, as indicated in Subfigure E, the switch 7 selectively outputs the resized video data (i.e., low-resolution video data) obtained through the low-resolution decoder 5 and resize block 6. This makes it possible to conceal the error in the main line data.

When it becomes possible to decode the main line data subsequently as shown in Subfigure B, the main decoder 4 starts decoding the main line data in question and sets the ready flag to "1" as depicted in Subfigure D. At this point, the switch 7 again outputs selectively the main line video data obtained by the main decoder 4, as illustrated in Subfigure E of FIG. 17.

As described, either the main line data or the low-resolution data are selectively output depending on whether or not the main line data are ready to be output. This feature makes it possible not only to improve the response of the disk reproducing apparatus but also to accomplish error concealment without recourse to dedicated hardware or software.

Figure 18:
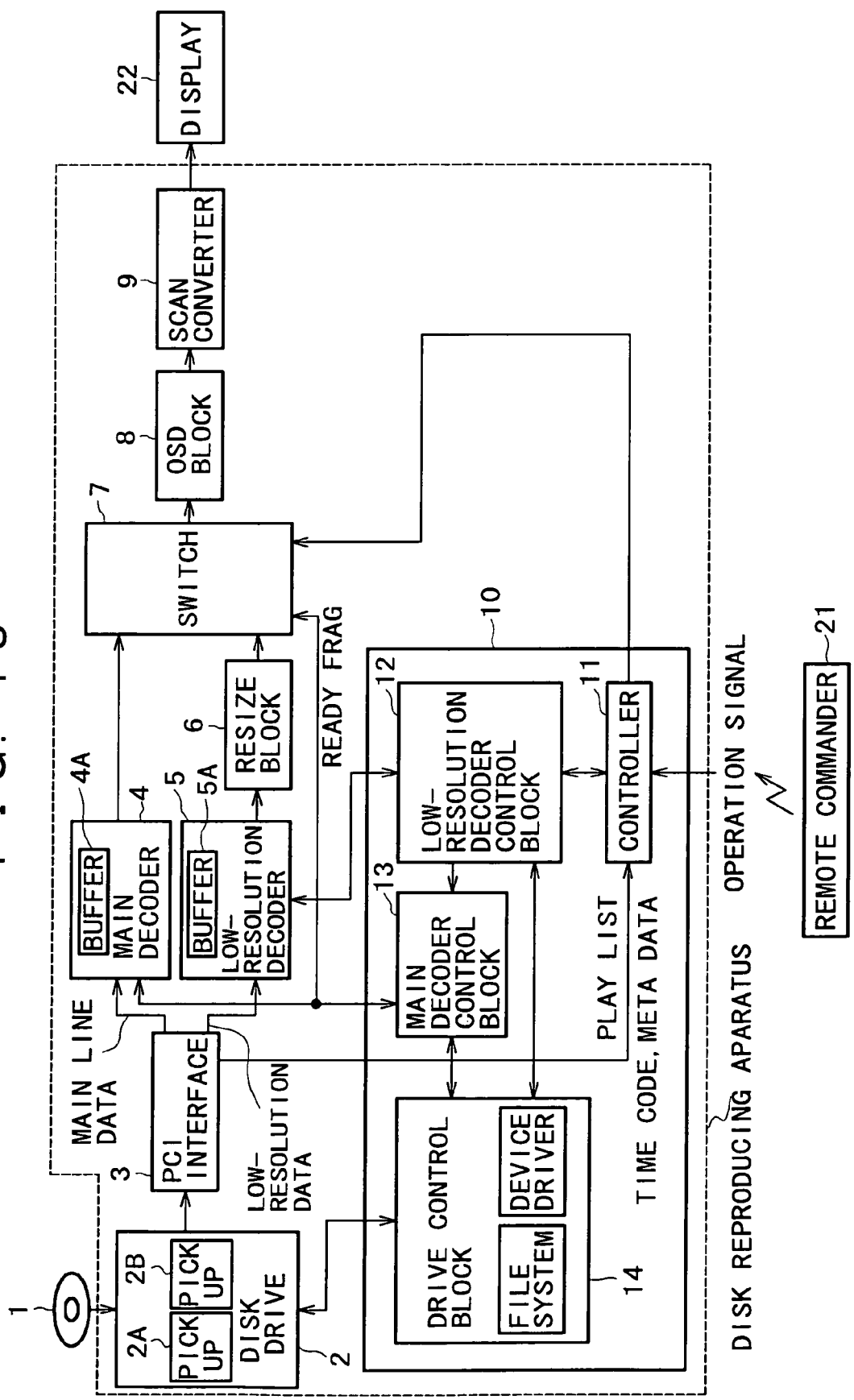
FIG. 18 is a block diagram showing a typical structure of a second embodiment of the disk reproducing apparatus according to the invention.

FIG. 18 is a block diagram showing a typical structure of the second embodiment of the disk reproducing apparatus according to the invention. In FIG. 18, the component parts which have their functionally equivalent counterparts included in FIG. 1 are designated by like reference numerals, and their descriptions are omitted hereunder where redundant. The disk reproducing apparatus of FIG. 18 is basically the same as its counterpart of FIG. 1 except that the pickup 2A is supplemented with another pickup 2B in the disk drive 2.

The setup of FIG. 18 is thus capable of reading data from the optical disk 1 in parallel fashion using the two pickups 2A and 2B. This feature substantially improves the rate of reading data from the optical disk 1 compared with the single pickup arrangement of FIG. 1.

Figure 19:
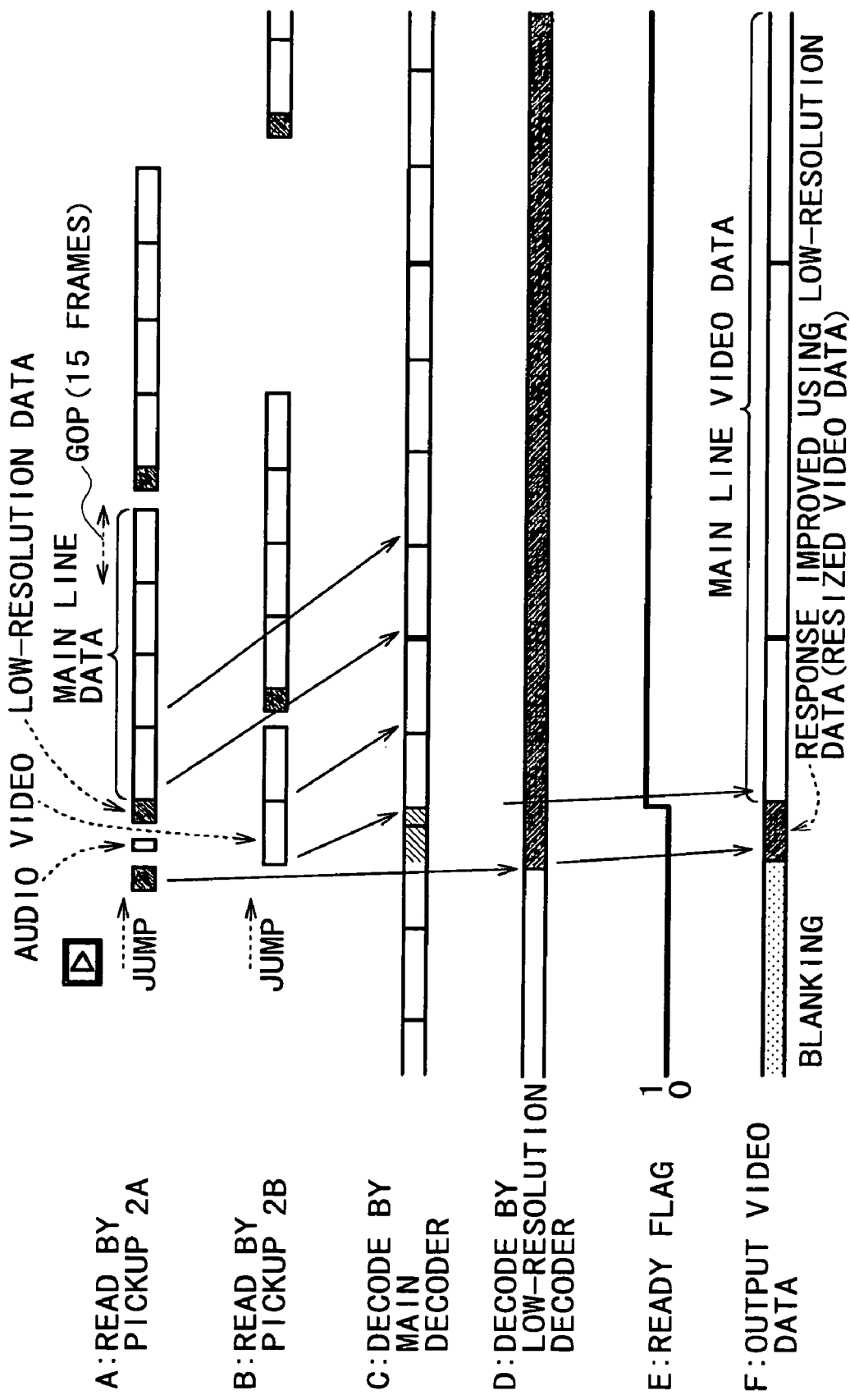
FIG. 19 is another explanatory view illustrating how the disk reproducing apparatus works.

How the disk reproducing apparatus of FIG. 18 works will now be described with reference to FIG. 19. Subfigures C, D, E and F of FIG. 19 are substantially the same as Subfigures B, C, D and E of FIG. 12 respectively, and their descriptions are omitted hereunder where redundant.

Where reproduction is ordered to start from a particular picture, the low-resolution decoder control block 12 requests low-resolution data from that particular picture onward from the drive control block 14. In turn, the drive control block 14 causes the pickup 2A of the disk drive 2 to read the tag containing the requested low-resolution data from the optical disk, as shown in Subfigure A. The low-resolution decoder control block 12 further requests from the drive control block 14 audio data from that picture onward which is being ordered to be reproduced. In response, the drive control block 14 causes the pickup 2A of the disk drive 2 to read the requested audio data from the optical disk 1 as depicted in Subfigure A.

Meanwhile, in keeping with the low-resolution data request from the low-resolution decoder control block 12, the main decoder control block 13 requests from the drive control block 14 the main line data from that picture onward which is needed to decode the picture ordered to be reproduced. In response, the drive control block 14 causes the pickup 2B of the disk drive 2 to read the requested main line data from the optical disk 1 as indicated in Subfigure B.

At this point, the main decoder control block 13 recognizes the storage location of the target main line data to be read on the basis of the meta data in the tag read by the pickup 2A from the optical disk 1.

Where the disk drive 2 has only one pickup 2A as in the setup of FIG. 1, the pickup 2A is needed to read both the tags and the main line data. By comparison, the setup of FIG. 18 has two pickups 2A and 2B in the disk drive 2A, each pickup being used for different purposes. Specifically, the pickup 2A reads the tag containing meta data from which to recognize the storage location of the main line data to be read, and the pickup 2B reads the main line data from the storage location recognized by use of the pickup 2A.

With the above feature in place, the disk reproducing apparatus of FIG. 18 can start reading and decoding main line data more quickly than the apparatus of FIG. 1. Comparing FIG. 12E with Subfigure F of FIG. 19 indicates further that the switchover from low-resolution video data to main line video data is also achieved more quickly by the apparatus of FIG. 18 than by its counterpart in FIG. 1.

After the pickup 2B has started reading the main line data from the optical disk 1, the pickups 2A and 2B divide the task between them of reading the target data from the disc in units of cartons, as shown illustratively in Subfigures A and B.

Figure 20:
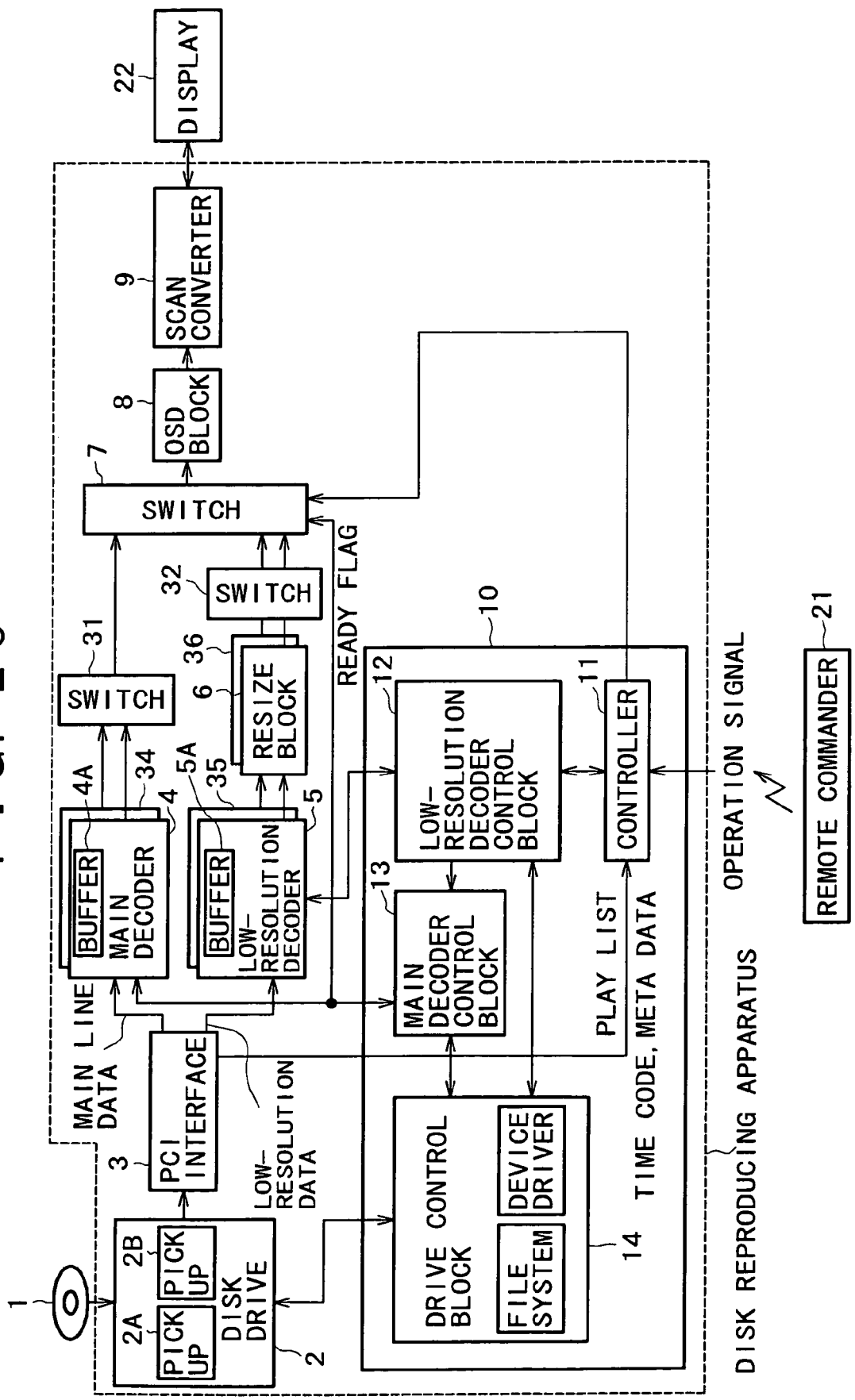
FIG. 20 is a block diagram showing another typical structure of a third embodiment of the disk reproducing apparatus according to the invention.

FIG. 20 is a block diagram showing a typical structure of the third embodiment of the disk reproducing apparatus according to the invention. In FIG. 20, the component parts which have their functionally equivalent counterparts included in FIG. 1 or 18 are designated by like reference numerals, and their descriptions are omitted hereunder where redundant. The disk reproducing apparatus of FIG. 20 is basically the same as its counterpart of FIG. 18 except that the main decoder 4, low-resolution decoder 5, and resize block 6 are supplemented with a main decoder 34, a low-resolution decoder 35, and resize block 36 respectively, and that switches 31 and 32 are additionally provided.

The main decoder 34, low-resolution decoder 35, and resize block 36 perform the same processing as the main decoder 4, low-resolution decoder 5, and resize block 6 respectively. The resize block 36 resizes the low-resolution video data furnished by the low-resolution decoder 35 into resized video data which are then output.

The switch 31 selects one of two streams of main line video data, one from the main decoder 4 and the other from the main decoder 34, and outputs the selected main line video data to the switch 7. The switch 32 selects one of two streams of resized video data, one from the resize block 6 and the other from the resize block 36, and outputs the resized video data thus selected to the switch 7.

In the disk reproducing apparatus of FIG. 20 having the above-outlined structure, the main decoder 4 decodes the main line data read by the pickups 2A and 2B, and supplies the decoded data to the switch 7 through the switch 31. Likewise, the main decoder 34 decodes the main line data read by the pickups 2A and 2B and feeds the decoded data to the switch 7 through the switch 31. The main decoders 4 and 34 decode the main line data in such a manner that the data will not overlap with one another during the decoding.

The low-resolution decoder 5 decodes the low-resolution data read by the pickups 2A and 2B and supplies the decoded data to the switch 7 through the resize block 6 and switch 32.

The low-resolution decoder 35 also decodes the low-resolution data read by the pickups 2A and 2B and feeds the decoded data to the switch 7 through the resize block 36 and switch 32. The low-resolution decoders 5 and 35 decode the low-resolution data in such a manner that the data will not overlap with one another during the decoding.

How the disk reproducing apparatus of FIG. 20 works will now be described with reference to FIG. 21. Subfigures A through F are substantially the same as Subfigures A through F of FIG. 19 respectively, and their descriptions are omitted hereunder where redundant. Subfigure C shows how main line data are illustratively decoded, the decoding being carried out by either the main decoder 4 or the main decoder 34. It is assumed in this example that the main line data are decoded by the main decoder 4. Likewise, Subfigure D indicates how low-resolution data are illustratively decoded, the decoding being executed by either the low-resolution decoder 5 or the low-resolution decoder 35. It is assumed illustratively that the low-resolution data are decoded by the low-resolution decoder 5.

Subfigure G shows the number of GOPs being held in the internal buffer 4A of the main decoder 4 decoding the main line data as depicted in Subfigure C. With data reproduction started, the reading of data from the optical disk 1 is controlled in such a manner that the internal buffer 4A of the main decoder 4 accumulates six to nine GOPs constituting the main line data as indicated in Subfigure G. This arrangement makes it possible to continue data reproduction without having to stop reading the main line data as discussed earlier.

In the setup of FIG. 20 including the two main decoders 4 and 34, the decoding of main line data is switched between the two decoders in synchronism with clip boundaries. Concurrently, the internal buffer of the main decoder decoding the main line data accumulates six to nine GOPs making up the main line data. This arrangement makes it possible, after the reading of the main line data from the current clip on the optical disk, to temporize until the reproduction of the next clip is started. This ensures the continuity of data reproduction without having to stop reading the main line data.

If the first picture to be reproduced from the next clip is the picture B1 or B2, then one of the main decoders 4 and 34 which is not decoding the main line data of the current clip may be arranged to decode the GOP preceding the picture B1 or B2. This allows the picture B1 or B2 to be decoded as well.

The series of steps described above may be executed either by hardware or by software. For software-based processing to take place, programs constituting the software may be installed upon use into a general-purpose computer or like equipment (including a so-called microprocessor and DSP).

FIG. 22 is a block diagram depicting a typical structure of one embodiment of the computer according to the invention, the computer being structured so as to carry out the programs constituting the series of steps described above. The programs may be stored beforehand on an internal recording medium such as a hard disc 105 or a ROM (read only memory) 103 in the computer.

Alternatively, the programs may be retained temporarily or permanently on a removable recording medium 111 such as flexible disks, a CD-ROM (compact disc read only memory), an MO (magneto-optical) disk, a DVD (digital versatile disc), a magnetic disk, or a semiconductor memory. The removable recording medium 111 may then be offered as so-called package software.

Besides being installed from the above-mentioned removable recording medium 111 into the computer, the programs may also be transferred to the computer from a website either wirelessly through a digital satellite broadcast link or in wired fashion over a LAN (local area network) or the Internet. The computer may receive the transferred programs through a communication block 108 and have them installed onto the internal hard disk 105.

The computer incorporates a CPU (central processing unit) 102. The CPU 102 is connected to an input/output interface 110 through a bus 101. The user enters commands by operating an input block 107 which is made up of a keyboard, a mouse and/or a microphone and which connects to the input/output interface 110. The entered commands reach the CPU 102 via the input/output interface 110 and cause the CPU 102 to execute accordingly the programs held in the ROM 103. Alternatively, for program execution, the CPU 102 loads into a RAM (random access memory) 104 the programs held on the hard disk 105; the programs transferred through a satellite link or over the network and installed onto the hard disk 105 through the communication block 108, or the programs read onto the hard disk 105 from the removable recording medium 111 loaded in a drive 109. The CPU 102 then carries out the processes outlined by the flowcharts or block diagrams discussed above. By way of the input/output interface 110, the CPU 102 illustratively allows the result of the processing to be output to an output block 106 constituted by an LCD (liquid crystal display) and/or speakers, transmitted to the outside from the communication block 108, or recorded onto the hard disk 105 as needed.

In this specification, the steps which describe the programs causing the computer to execute the diverse processes may not be carried out necessarily in the depicted sequence of the flowcharts (i.e., on a time series basis); the steps may alternatively include those conducted parallelly or individually (e.g., in parallel or object-oriented fashion).

The programs may be processed either by a single computer or by a plurality of computers in a distributed manner. For execution, the programs may be transferred to a remotely located computer or computers.

As described and according to the invention, both low-resolution data and main line data are stored on the optical disk 1 so that one of the two bodies of data may be selectively output depending on whether or not the main line data are being ready to be output. This scheme enhances the response of the disk reproducing apparatus without having to speed up the decoding of main line data using illustratively intra-encoding alone as the main line data encoding method. Where the disk reproducing apparatus in use for reproducing data from the optical disk 1 happens to provide lower performance than expected, it is still possible to shorten the duration period from the time a reproduction command is issued until reproduction output is obtained while ensuring the continuity of data reproduction.

According to the invention, the same circuit structure as that for improving the response of the disk reproducing apparatus is utilized to accomplish error concealment. That means no extra cost is needed for providing the error concealment measures.

Although the above-described embodiments were shown dealing with the reproduction of video data, this is not limitative of the invention. Alternatively, the invention may be practiced where audio data are to be reproduced.

The above-described embodiments were-shown adopting as the low-resolution data those data obtained by lowering the resolution of the corresponding main line data. However, this is not limitative of the invention. Alternatively, it is possible to use as the low-resolution data those acquired by reducing the bit assignments for the pixels constituting the main line data.

With the embodiments described above, the method for encoding the low-resolution data was shown complying with the JPEG standard. Alternatively, any other suitable standard may be complied with by the low-resolution encoding method of the invention.

Also with the embodiments discussed above, the method for encoding the main line data was shown complying with the MPEG standard. Alternatively, any other suitable standard may be complied with by the main line data encoding method of the invention.

The above-described embodiments were shown adopting as the low-resolution data and main line data those data obtained by encoding video data. Alternatively, the video data may be used unmodified as the low-resolution data and main line data.

For the embodiments described above, the cartons were shown measuring about two seconds long each. However, this is not limitative of the invention. If the cartons are made shorter, track jumps from low-resolution data to main line data may be further shortened or omitted outright in order to further improve the response of the disk reproducing apparatus. Conversely, if the cartons are made longer, it becomes easier to read out and retain low-resolution data in advance. This arrangement eliminates the need for reading low-resolution data every time reproduction is started, so that the response of the apparatus may be improved further.

As many apparently different embodiments of this invention may be made without departing from the spirit and scope thereof, it is to be understood that the invention is not limited to the specific embodiments thereof except as defined in the appended claims.

What is claimed is:

1. A data processing apparatus comprising:
   a detector for detecting completion of preparations for outputting first data read from a data recording medium which stores said first data and second data corresponding to said first data and having a data amount smaller than that of said first data, wherein said first data are made up of a continuous collection of clips, said first data being reproduced on a clip by clip basis;
   a position calculator for calculating a current clip read ending position and a next clip read starting position, and determining whether the current clip remaining read duration is less than or equal to the difference between the current clip remaining reproduction duration and a next clip reproduction preparation duration;
   a selector for selectively outputting said second data read from said data recording medium until the completion of said preparations for outputting said first data is detected, said selector further outputting selectively said first data once the completion of said preparations for outputting said first data is detected; and
   a ready flag that denotes a status of the preparations based upon the determination of the position calculator.

2. A data processing apparatus according to claim 1, further comprising:
   a first controller for controlling reproduction of said first data; and
   a second controller for controlling reproduction of said second data;
   wherein said first controller controls the reproduction of said first data in response to the reproduction of said second data controlled by said second controller.

3. A data processing apparatus according to claim 1, wherein said first data and said second data corresponding to said first data are stored intermittently on said data recording medium.

4. A data processing apparatus according to claim 1, wherein said first data are video data and said second data are video data obtained by lowering resolution of the video data constituting said first data.

5. A data processing apparatus according to claim 4, further comprising a resizer for resizing the video data constituting said second data into the same size as that of said first data.

6. A data processing apparatus according to claim 1, further comprising a decoder for decoding said first data furnished as encoded data;
   wherein said detector detects completion of preparations for outputting results of the decoding performed by said decoder.

7. A data processing apparatus according to claim 1, further comprising a reader for reading said first data and said second data from said data recording medium.

8. A data processing apparatus according to claim 7, wherein said reader stops reading of the current clip from said data recording medium in said current clip read ending position and starts the reading of the next clip from said next clip read starting position.

9. A data processing method comprising the steps of:
   detecting completion of preparations for outputting first data read from a data recording medium which stores said first data and second data corresponding to said first data and having a data amount smaller than that of said first data, wherein said first data are made up of a continuous collection of clips, said first data being reproduced on a clip by clip basis;
   calculating a current clip read ending position and a next clip read starting position;
   determining whether the current clip remaining read duration is less than or equal to the difference between the current clip remaining reproduction duration and a next clip reproduction preparation duration;
   outputting selectively said second data read from said data recording medium until the completion of said preparations for outputting said first data is detected, said outputting step further outputting selectively said first data once the completion of said preparations for outputting said first data is detected; and
   utilizing a ready flag to denote a status of the preparations based upon the determining step.

10. A data processing method according to claim 9, further comprising the steps of:
    firstly controlling reproduction of said first data; and
    secondly controlling reproduction of said second data;
    wherein said first controlling step controls the reproduction of said first data in response to the reproduction of said second data controlled in said second controlling step.

11. A data processing method according to claim 9, wherein said first data and said second data corresponding to said first data are stored intermittently on said data recording medium.

12. A data processing method according to claim 9, wherein said first data are video data and said second data are video data obtained by lowering resolution of the video data constituting said first data.

13. A data processing method according to claim 12, further comprising the step of resizing the video data constituting said second data into the same size as that of said first data.

14. A data processing method according to claim 9, further comprising the step of decoding said first data furnished as encoded data;
    wherein said detecting step detects completion of preparations for outputting results of the decoding performed in said decoding step.

15. A data processing method according to claim 9, further comprising the step of reading said first data and said second data from said data recording medium.

16. A data processing method according to claim 15, and wherein said reader stops reading of the current clip from said data recording medium in said current clip read ending position and starts the reading of the next clip from said next clip read starting position.

17. A non-transitory computer-readable storage medium storing a computer program for causing a computer to execute a data processing method, said data processing method comprising the steps of:
- detecting completion of preparations for outputting first data read from a data recording medium which stores said first data and second data corresponding to said first data and having a data amount smaller than that of said first data, wherein said first data are made up of a continuous collection of clips, said first data being reproduced on a clip by clip basis;
- calculating a current clip read ending position and a next clip read starting position;
- determining whether the current clip remaining read duration is less than or equal to the difference between the current clip remaining reproduction duration and a next clip reproduction preparation duration; and
- outputting selectively said second data read from said data recording medium until the completion of said preparations for outputting said first data is detected,
- wherein said outputting step further comprises: outputting selectively said first data once the completion of said preparations for outputting said first data is detected,
- utilizing a ready flag to denote a status of the preparations based upon the determining step.

18. The non-transitory computer-readable storage medium according to claim 17, wherein said data processing method further comprises the steps of:
- firstly controlling reproduction of said first data;
- and secondly controlling reproduction of said second data;
- wherein said first controlling step controls the reproduction of said first data in response to the reproduction of said second data controlled in said second controlling step.

19. The non-transitory computer-readable storage medium according to claim 17, wherein said first data and said second data corresponding to said first data are stored intermittently on said data recording medium.

20. The non-transitory computer-readable medium according to claim 17, wherein said first data are video data and said second data are video data obtained by lowering resolution of the video data constituting said first data.

21. The non-transitory computer-readable storage medium according to claim 20, wherein said data processing method further comprises the step of resizing the video data constituting said second data into the same size as that of said first data.

22. The non-transitory computer-readable storage medium according to claim 17, wherein said data processing method further comprises the step of decoding said first data furnished as encoded data; and wherein said detecting step detects completion of preparations for outputting results of the decoding performed in said decoding step.

23. The non-transitory computer-readable storage medium according to claim 17, wherein said data processing method further comprises the step of reading said first data and said second data from said data recording medium.

24. The non-transitory computer-readable storage medium according to claim 23, wherein said reader stops reading of the current clip from said data recording medium in said current clip read ending position and starts the reading of the next clip from said next clip read starting position.

* * * * *